United States Patent
Tsuji

(10) Patent No.: US 12,529,025 B2
(45) Date of Patent: Jan. 20, 2026

(54) CELL CULTURE CHIP, CELL CULTURE APPARATUS, AND CELL CULTURE METHOD

(71) Applicant: Panasonic Intellectual Property Management Co., Ltd., Osaka (JP)

(72) Inventor: Kiyotaka Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 863 days.

(21) Appl. No.: 17/690,054

(22) Filed: Mar. 9, 2022

(65) Prior Publication Data

US 2022/0195374 A1 Jun. 23, 2022

Related U.S. Application Data

(63) Continuation of application No. PCT/JP2020/032974, filed on Sep. 1, 2020.

(30) Foreign Application Priority Data

Oct. 2, 2019 (JP) .................. 2019-182459
Jul. 29, 2020 (JP) .................. 2020-128586

(51) Int. Cl.
*C12M 1/34* (2006.01)
*C12M 1/00* (2006.01)
(Continued)

(52) U.S. Cl.
CPC ............ *C12M 41/46* (2013.01); *C12M 23/20* (2013.01); *C12M 23/22* (2013.01); *C12M 25/02* (2013.01); *C12N 5/0068* (2013.01); *G01N 27/04* (2013.01)

(58) Field of Classification Search
None
See application file for complete search history.

(56) References Cited

U.S. PATENT DOCUMENTS 9,453,196 B2 * 9/2016 Smith .................. C12N 5/0068
11,535,821 B2 * 12/2022 Katayama .............. C12M 23/38
(Continued)

FOREIGN PATENT DOCUMENTS

JP 2014-514926 6/2014
JP 2017-513483 6/2017
(Continued)

OTHER PUBLICATIONS

International Search Report of PCT application No. PCT/JP2020/032974 dated Nov. 24, 2020.
(Continued)

*Primary Examiner* — Michael A Marcheschi
*Assistant Examiner* — Ashley Lopezlira
(74) *Attorney, Agent, or Firm* — Rimon P.C.

(57) ABSTRACT

A cell culture chip comprises a body having a first flow channel and a second flow channel at least part of which overlaps the first flow channel when seen from an angle parallel with a predetermined direction, a cell separation membrane having first and second principal surfaces facing away from each other, the cell separation membrane being disposed between the first flow channel and the second flow channel so that the first flow channel is located on the first principal surface and the second flow channel is located on the second principal surface, a first electrode which is in contact with the first flow channel and extending through the first flow channel along the first flow channel, and a second electrode which is in contact with the second flow channel and extending through the second flow channel along the second flow channel.

19 Claims, 20 Drawing Sheets

(51) Int. Cl.
*C12M 1/12* (2006.01)
*C12N 5/00* (2006.01)
*G01N 27/04* (2006.01)

(56) References Cited

U.S. PATENT DOCUMENTS

| | | | |
|---|---|---|---|
| 2002/0137121 A1* | 9/2002 | Rubinsky | G01N 33/48728 |
| | | | 435/29 |
| 2008/0227191 A1* | 9/2008 | Tsukada | C12M 23/20 |
| | | | 435/308.1 |
| 2010/0327874 A1* | 12/2010 | Liu | G01N 33/48721 |
| | | | 324/464 |
| 2011/0250585 A1* | 10/2011 | Ingber | G01N 33/5005 |
| | | | 977/773 |
| 2012/0135446 A1* | 5/2012 | Collins | C12M 23/16 |
| | | | 435/29 |
| 2014/0038225 A1 | 2/2014 | Goedecke et al. | |
| 2015/0301027 A1* | 10/2015 | Charest | C12M 41/36 |
| | | | 435/287.1 |
| 2018/0104693 A1 | 4/2018 | Merten et al. | |
| 2018/0142196 A1* | 5/2018 | Coppeta | C12M 23/12 |
| 2020/0157485 A1 | 5/2020 | Fujiyama et al. | |

FOREIGN PATENT DOCUMENTS

| | | |
|---|---|---|
| JP | 2018-515764 | 6/2018 |
| JP | 2018-189474 | 11/2018 |
| JP | 2020-080697 | 6/2020 |

OTHER PUBLICATIONS

Olivier Y. F. Henry et al., "Organs-on-chips with integrated electrodes for trans-epithelial electrical resistance (TEER) measurements of human epithelial barrier function", Lab on a Chip, May 30, 2017, 17, 2264-2271.

Yuji Takata et al., "On Chip Monitoring of Tight Junctions Formed on an Epithelial Monolayer and the Effect of Extracellular Calcium Ion Removal From Apical and Basal Sides", IEEE MEMS, vol. 33, Jan. 18, 2020, pp. 481-484.

* cited by examiner

CELL CULTURE CHIP, CELL CULTURE APPARATUS, AND CELL CULTURE METHOD

This application is a continuation of PCT Application PCT/JP2020/032974, filed Sep. 1, 2020; which claims benefit to Japanese Patent Application JP2020-128586, filed Jul. 29, 2020 and Japanese Patent Application JP2019-182459, filed Oct. 2, 2019; said applications incorporated herein by reference.

BACKGROUND

1. Technical Field

The present disclosure relates to a cell culture chip, a cell culture apparatus including the cell culture chip, and a cell culture method involving the use of the cell culture chip.

2. Description of the Related Art

In recent years, organs-on-chips (OOCs) have been actively developed as cell culture chips (see, for example, Japanese Unexamined Patent Application Publication No. 2018-189474).

SUMMARY

Incidentally, conventional OOCs disclosed in Japanese Unexamined Patent Application Publication No. 2018-189474 or other literature have undesirably lacked accuracy in evaluation of cells.

One non-limiting and exemplary embodiment provides, for example, a cell culture chip that is capable of a more accurate evaluation of cells.

In one general aspect, the techniques disclosed here feature a cell culture chip comprising a body comprising a first flow channel and a second flow channel at least part of which overlaps the first flow channel when seen from an angle parallel with a predetermined direction, a cell separation membrane having first and second principal surfaces facing away from each other, the cell separation membrane being disposed between the first flow channel and the second flow channel so that the first flow channel is located on the first principal surface and the second flow channel is located on the second principal surface, a first electrode which is in contact with the first flow channel and extending through the first flow channel along the first flow channel, and a second electrode which is in contact with the second flow channel and extending through the second flow channel along the second flow channel.

The present disclosure makes a more accurate evaluation of cells possible.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Brief Overview of the Present Disclosure

Figure 1A:
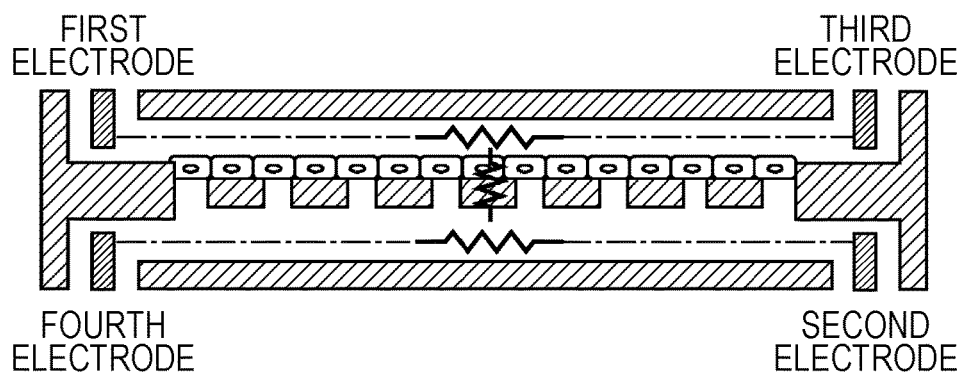
FIG. 1A is a diagram schematically showing a cell culture chip according to a comparative example.

In one general aspect, the techniques disclosed here feature a cell culture chip comprising a body comprising a first flow channel and a second flow channel at least part of which overlaps the first flow channel when seen from an angle parallel with a predetermined direction, a cell separation membrane having first and second principal surfaces facing away from each other, the cell separation membrane being disposed between the first flow channel and the second flow channel so that the first flow channel is located on the first principal surface and the second flow channel is located on the second principal surface, a first electrode which is in contact with the first flow channel and extending through the first flow channel along the first flow channel, and a second electrode which is in contact with the second flow channel and extending through the second flow channel along the second flow channel.

According to this configuration, the electric resistance of a cell sheet cultured on the cell separation membrane disposed between the first flow channel and the second flow channel can be measured with the first electrode extending along the first flow channel and the second electrode extending along the second flow channel. In the measurement of the electric resistance of the cell sheet, there is a decrease in electrically-conducting distance that electricity is conducted through fluids inside the first and second flow channels interposed between the first electrode and the second electrode. Accordingly, the influence of potential drops during the conduction of electricity through the fluids is reduced, so that the electric resistance of the cell sheet can be more accurately measured. Therefore, a more accurate estimation of a cell state based on a more accurate electric resistance of the cell sheet makes it possible to make a more accurate evaluation of cells.

Further, for example, the first flow channel and the second flow channel may include an electric field region that is a region spanning the first flow channel and the second flow channel in a place where the first flow channel and the second flow channel extend over each other when seen from the angle parallel with the predetermined direction, the electric field region being a region where the first electrode and the second electrode extend in the region, and a length of each of the first and second electrodes in a direction of extension may be greater than or equal to 25% of a length of the electric field region in a direction of extension.

This configuration makes it possible, for example, to, in a case where the electric resistance of a target of measurement is higher than or equal to 1000Ω, measure the electric resistance under such a standard of measurement that an error rate falls within a range of ±20%. This makes it possible to achieve a cell culture chip that is capable of a more accurate evaluation of cells based on a more accurate measured value of electric resistance.

Further, for example, the length of each of the first and second electrodes in the direction of extension may be greater than or equal to 70% of the length of the electric field region in the direction of extension.

This configuration makes it possible, for example, to, in a case where the electric resistance of a target of measurement is higher than or equal to 100Ω, measure the electric resistance under such a standard of measurement that an error rate falls within a range of ±20%. This makes it possible to achieve a cell culture chip that is capable of a more accurate evaluation of cells based on a more accurate measured value of electric resistance.

Further, for example, the length of each of the first and second electrodes in the direction of extension may be greater than or equal to 75% of the length of the electric field region in the direction of extension.

This configuration makes it possible, for example, to, in a case where the electric resistance of a target of measurement is higher than or equal to 50Ω, measure the electric resistance under such a standard of measurement that an error rate falls within a range of ±20%. This makes it possible to achieve a cell culture chip that is capable of more accurately measuring 50Ω, which is substantially the lowest electric resistance that cultured cells are assumed to have, and more accurately evaluating cells.

Further, for example, in the electric field region, a total of lengths of the first flow channel and the second flow channel in the predetermined direction may be greater than or equal to 0.2 mm and less than or equal to 1.5 mm.

This configuration makes it possible to achieve a cell culture chip that, under a predetermined condition, is capable of a more accurate evaluation of cells based on a more accurate measured value of electric resistance.

Further, for example, the first electrode and the second electrode may each have a width of 0.1 mm in a direction across the direction of extension of the first electrode and the second electrode.

This configuration makes it possible to achieve a cell culture chip that, under a predetermined condition, is capable of a more accurate evaluation of cells based on a more accurate measured value of electric resistance.

Further, for example, the body may comprise a laminated structure in which a first substrate having a principal surface on which the first electrode has been formed, a first bulkhead layer, a second bulkhead layer, and a second substrate having a principal surface on which the second electrode has been formed have been stacked in this order along the predetermined direction, the cell separation membrane may be sandwiched between the first bulkhead layer and the second bulkhead layer, the first bulkhead layer may comprise a first through-hole penetrating the first bulkhead layer in a thickness direction in correspondence with the first electrode formed on the first substrate, the second bulkhead layer may comprise a second through-hole penetrating the second bulkhead layer in a thickness direction in correspondence with the second electrode formed on the second substrate, the first flow channel may comprise a first main flow channel demarcated by the principal surface on which the first electrode has been formed, the first through-hole, and the first principal surface, the second flow channel may comprise a second main flow channel demarcated by the principal surface on which the second electrode has been formed, the second through-hole, and the second principal surface, and the first main flow channel and the second main flow channel may overlap when seen from the angle parallel with the predetermined direction.

According to this configuration, the first flow channel can be formed by a laminated structure formed of the first substrate, the first bulkhead layer, the cell separation membrane, and the second bulkhead layer, and the second flow channel can be formed by a laminated structure formed of the second substrate, the second bulkhead layer, the cell separation membrane, and the first bulkhead layer. Further, the first main flow channel, included in the first flow channel, that is demarcated by the first substrate, the first bulkhead layer, and the cell separation membrane and the second main flow channel, included in the second flow channel, that is demarcated by the second substrate, the second bulkhead layer, and the cell separation membrane overlap. This configuration brings about a state where the first main flow channel and the second main flow channel are in contact with both surfaces, respectively, of the cell separation membrane. The electric resistance of a cell sheet cultured on the cell separation membrane can be measured with the first electrode on the first main flow channel and the second electrode on the second main flow channel. A cell culture chip is required to be easily processable, as it has an extremely small structure. Forming a cell culture chip as a laminated structure as noted above makes it possible to easily form a cell culture chip of an extremely small and complex microstructure.

Further, for example, the cell culture chip may further include a first insulating film having a shape of a sheet disposed between the first substrate and the first bulkhead layer and comprising a first opening penetrating the first insulating film in a thickness direction in correspondence with the first electrode and a second insulating film having a shape of a sheet disposed between the second substrate and the second bulkhead layer and comprising a second opening penetrating the second insulating film in a thickness direction in correspondence with the second electrode.

In a case where the first substrate and the first bulkhead layer are constituted by hard materials and a case where the second substrate and the second bulkhead layer are constituted by hard materials, a fluid flowing through the first flow channel or the second flow channel may leak out from a gap between the first substrate and the first bulkhead layer or between the second substrate and the second bulkhead layer. In particular, in a case where a conductor pattern extending outward from the first electrode or the second electrode is formed or other cases, a fluid leaks out from the gap unless the thickness of such a conductor pattern can be absorbed. In a case where a fluid has leaked out from the gap, the culture of cells is affected, and the measurement of electric resistance by the first electrode and the second electrode is affected too. Accordingly, leakage of a fluid from the gap is reduced by placing the first insulating film and the second insulating film so as to fill such a gap. This reduces the influence on an estimation of a cell state by leakage of a fluid from the gap, thus making it possible to make a more accurate evaluation of cells.

Further, for example, the first flow channel may comprise the first main flow channel, a first inflow channel, and a first outflow channels, the first inflow channel and the first outflow channels leading to the first main flow channel, the second flow channel may comprise the second main flow channel, a second inflow channel, and a second outflow channels, the second inflow channel and the second outflow channels leading to the second main flow channel, and when seen from the angle parallel with the predetermined direction, the first inflow channel and the second inflow channel may not overlap and the first outflow channel and the second outflow channel may not overlap.

According to this configuration, an inlet through which a fluid is injected into the first flow channel and an inlet through which a fluid is injected into the second flow channel can be formed in different positions in a plan view as seen from an angle parallel with a direction of stacking. Similarly, an outlet through which a fluid is discharged from the first flow channel and an outlet through which a fluid is discharged from the second flow channel can be formed in different positions in a plan view as seen from an angle parallel with the direction of stacking. It is desirable that the inlets and the outlets have openings facing in a direction opposite to the direction of gravitational force. By the inlets having openings facing in a direction opposite to the direction of gravitational force, fluids can be injected along the direction of gravitational force. Further, by the outlets having openings facing in a direction opposite to the direction of gravitational force, fluids can be retained in the flow channels until the fluids reach certain levels. By thus being able to form openings in different positions in a plane view as seen from the angle parallel with the direction of stacking, a configuration can be achieved in which the inlets and the outlets of the first flow channel and the second flow channel all have openings facing in a direction opposite to the direction of gravitational force.

Further, for example, assuming that a region where the first main flow channel and the second main flow channel overlap when seen from the angle parallel with the predetermined direction is a cell culture region, the first electrode may extend to outside the cell culture region in a direction along the first main flow channel and the second electrode may extend to outside the cell culture region in a direction along the second main flow channel.

The first electrode is formed on the principal surface of the first substrate, and the second electrode is formed on the principal surface of the second substrate. That is, the first electrode and the second electrode have steps projecting from the principal surfaces. The presence of such projection structures in the first flow channel and the second flow channel generates microturbulences. In particular, in the case of steps projecting across the direction of flow of a fluid, turbulences are generated on such a large scale that a measurement of the electric resistance of cells may be affected. Extending the first electrode and the second electrode to outside the cell culture region makes it possible to, at least within the cell culture region, eliminate steps projecting across the direction of flow of a fluid. This reduces the occurrence of turbulences, and makes it possible to make a more accurate evaluation of cells based on a more accurate measurement of electric resistance.

Further, for example, the cell culture chip may further comprise a first lead that, on the first substrate, electrically connects a first contact point provided on the first substrate with one end of the first electrode extended to outside the cell culture region and a second lead that, on the second substrate, electrically connects a second contact point provided on the second substrate with one end of the second electrode extended to outside the cell culture region.

According to this configuration, the first lead, which electrically connects the first electrode with the first contact point, and the second lead, which electrically connects the second electrode with the second contact point, can be disposed outside the cell culture region. As noted above, steps projecting across the direction of flow of a fluid may affect a measurement of the electric resistance of cells; however, at least within the cell culture region, the first lead and the second lead can be prevented from having steps projecting across the direction of flow of a fluid. This reduces the occurrence of turbulences, and makes it possible to make a more accurate evaluation of cells based on a more accurate measurement of electric resistance.

Further, for example, the cell culture chip may further comprise a third electrode which is in contact with the first flow channel and extending through the first flow channel along the first flow channel while being at a distance from the first electrode and a fourth electrode which is in contact with the second flow channel and extending through the second flow channel along the second flow channel while being at a distance from the second electrode.

This configuration makes it possible to measure the electric resistance of cells with a four-terminal system comprising four electrodes, namely the first to fourth electrodes. A more accurate measurement of electric resistance can be made by subtracting a resistance component that may be included as an error. This makes it possible to make a more accurate evaluation of cells based on a more accurate measurement of electric resistance.

Further, for example, the first electrode and the third electrode may each have a shape of a flat plate having a principal surface facing the first flow channel, the second electrode and the fourth electrode may each have a shape of a flat plate having a principal surface facing the second flow channel, the third electrode may be wider in width than the first electrode, and the fourth electrode may be narrower in width than the second electrode.

This configuration makes it possible to carry out a more accurate measurement of electric current in a case where the first and third electrodes are responsible for potential measurement and current measurement, respectively. This makes it possible to more accurately measure electric resistance, thus making it possible to make a more accurate evaluation of cells.

Further, for example, the first substrate and the first electrode may be transparent. The second substrate and the second electrode may be transparent.

This configuration makes it possible to use the first substrate and the first electrode or the second substrate and the second electrode to visually observe cells being cultured. This makes possible to also evaluate visual changes in making an evaluation of cells, thus making it possible to make a more accurate evaluation of the cells.

In one general aspect, the techniques disclosed here feature a cell culture apparatus comprising the cell culture chip described above and a measuring instrument for measuring electric resistance between the first electrode and the second electrode.

According to this configuration, the electric resistance of a cell sheet cultured on the cell separation membrane disposed between the first flow channel and the second flow channel can be measured using the measuring instrument by the first electrode extending along the first flow channel and the second electrode extending along the second flow channel. In the measurement of the electric resistance of the cell sheet, there is a decrease in electrically-conducting distance that electricity is conducted through fluids inside the first and second flow channels interposed between the first electrode and the second electrode. Accordingly, the influence of potential drops during the conduction of electricity through the fluids is reduced, and the electric resistance of the cell sheet can be more accurately measured. Therefore, a more accurate estimation of a cell state based on a more accurate electric resistance of the cell sheet makes it possible to make a more accurate evaluation of cells.

In one general aspect, the techniques disclosed here feature a cell culture method comprising culturing predetermined cells with the cell culture chip described above and measuring an electric resistance of the thus-cultured cells with the first electrode and the second electrode.

According to this configuration, in the measuring step, the electric resistance of a cell sheet cultured on the cell separation membrane disposed between the first flow channel and the second flow channel can be measured by the first electrode extending along the first flow channel and the second electrode extending along the second flow channel. In the measurement of the electric resistance of the cell sheet, there is a decrease in electrically-conducting distance that electricity is conducted through fluids inside the first and second flow channels interposed between the first electrode and the second electrode. Accordingly, the influence of potential drops during the conduction of electricity through the fluids is reduced, and the electric resistance of the cell sheet can be more accurately measured. Therefore, a more accurate estimation of a cell state based on a more accurate electric resistance of the cell sheet makes it possible to make a more accurate evaluation of cells.

It should be noted that general or specific embodiments may be implemented as a system, a method, an integrated circuit, a computer program, a computer-readable storage medium such as a CD-ROM, or any selective combination thereof.

Underlying Knowledge Forming Basis of the Present Disclosure

With demands aroused for reductions in cost of development of drugs and for downsizing of nonclinical tests and clinical tests from an ethical point of view, organs-on-chips (OOCs), such as the organ-on-a-chip disclosed in Japanese Unexamined Patent Application Publication No. 2018-189474, have been actively developed as new technologies with which to meet such demands. An OOC is a device in which to reproduce an in vivo tissue function on a microscale by culturing cells in an artificial minimal space formed by a combination of resin, glass, or other substances. It is expected that by adding a drug to cells cultured with such a device, efficacy and toxicity tests on the drug and absorption, distribution, metabolism, excretion, or other tests that have conventionally had to be evaluated by animal testing will become evaluatable in an artificial device.

Such an evaluation system is required to be high in accuracy, as it is aimed at drugs. There is room for improvement in an OOC being developed at present, as it employs a method of visually checking the state of cells being cultured in the device. That is, due to variations in the state of cells serving as subjects for an evaluation test on a drug or other tests, a conventional OOC has had difficulty in determining whether a test result is attributed to the drug or attributed to the variations in the state of the cells. In other words, a cell test involving the use of a conventional OOC has undesirably lacked accuracy.

A more detailed description is given with reference to FIGS. 1A to 2. FIG. 1A is a diagram schematically showing a cell culture chip according to a comparative example. In the OOC, a cell sheet reproducing a tissue function of cells is formed by culturing the cells into a sheet.

FIG. 1A illustrates such a cell sheet (i.e. a row of rectangles, located in the top center of the drawing, that have rounded corners and contain ellipses) and first and second flow channels (i.e. a space above the cell sheet and a space below the cell sheet) formed so that the cell sheet is sandwiched the first flow channel and the second flow channel. In the first flow channel, which is filled with a liquid culture medium in which cells are cultured, a first electrode and a third electrode are disposed to be immersed in the culture medium. Similarly, in the second flow channel, which is filled with a liquid culture medium in which cells are cultured, a second electrode and a fourth electrode are disposed to be immersed in the culture medium. The first flow channel and the second flow channel are demarcated so that medium components can be exchanged through a cell separation membrane, located in the center of the drawing, that has a plurality of through-holes allowing the first flow channel and the second flow channel to communicate to each other. The term "demarcated" here means the formation of a predetermined space by wall surfaces formed between a bottom surface and a top surface.

For example, by using the cell culture chip according to the comparative example as shown in FIG. 1A, electric resistance between the first electrode and the second electrode is measured in a cell sheet formed on the OOC. This makes it possible to observe the state of culture of the cell sheet in the cell culture chip as a rise in electric resistance by the formation of, for example, tight junctions between cells in the cell sheet from a state where no electric resistance is exhibited by the through-holes.

As noted above, in a case where the electric resistance between the first electrode and the second electrode is measured, electric resistance in a path between the first electrode and the second electrode over which electricity passes via the culture medium in the first flow channel and the culture medium in the second flow channel in addition to the cell sheet. That is, the electric resistance of the culture medium in the first flow channel and the culture medium in the second flow channel causes noise to be contained in the electric resistance of the cell sheet to be measured.

Figure 1B:
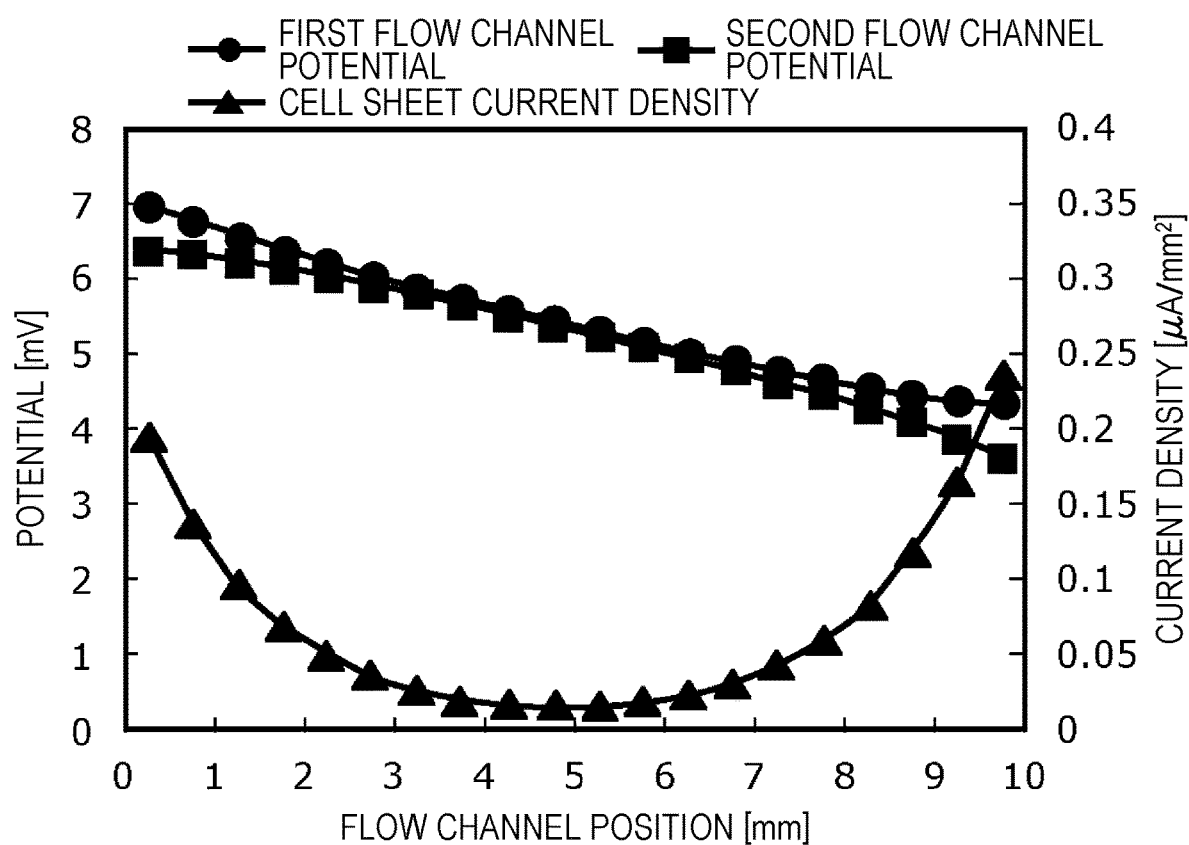
FIG. 1B is a diagram showing distributions of interelectrode potentials and current densities according to the comparative example.

Further, such electric resistance in the culture media varies from position to position in the cell culture chip. FIG. 1B is a diagram showing distributions of interelectrode potentials and current densities according to the comparative example. FIG. 1B shows a potential drop in a flow channel from a first end (first electrode side end) of the cell sheet shown in FIG. 1A to a second end (second electrode side end). FIG. 1B shows a first end side as the origin (0 mm) of flow channel position and shows a second end side as the flow channel position of 10 mm, with a potential of 10 mV being applied between the first electrode and the second electrode and the electric resistance of the cell sheet being set at 310Ω.

In the first flow channel, a potential of approximately 7.0 mV is measured on the first end side, and a potential of approximately 4.3 mV is measured on the second end side. In the second flow channel, a potential of approximately 6.3 mV is measured on the first end side, and a potential of approximately 3.6 mV is measured on the second end side. Further, the distribution of current densities between the first flow channel and the second flow channel as calculated on the basis of these distributions of potentials exhibits a downward convex distribution in which high current densities are observed at the first end and the second end and low current densities are observed in the center. Such a distribution shows, in short, that it is easy for electricity to pass at the first end and the second end and that it is hard for electricity to pass in the center.

Figure 1C:
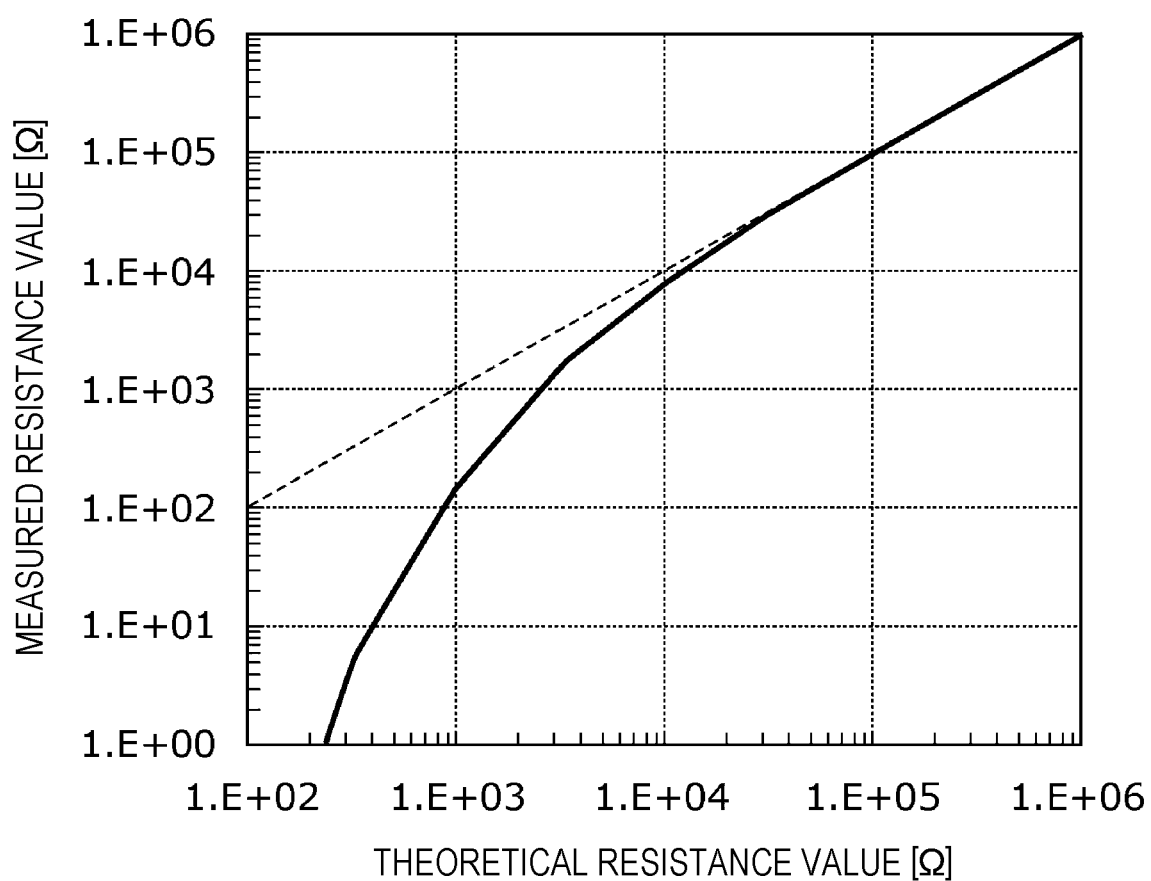
FIG. 1C is a simulation diagram showing theoretical values and measured values of electric resistance according to the comparative example.

FIG. 1C is a simulation diagram showing theoretical values and measured values of electric resistance according to the comparative example. FIG. 1C is a plot of theoretical values of the electric resistance of the cell sheet and values calculated by simulating measured values that could be determined by actual measurement. It is desirable that the theoretical values and the measured values draw straight lines sharing the same slope as indicated by a dashed line, but in reality, the theoretical values and the measured values draw a curved as indicated by a solid line. In a case where the cell sheet exhibits high electric resistance, there is only a slight difference between the theoretical values and the measured values. On the other hand, in a case where the cell sheet exhibits low electric resistance, (e.g. a case where the cell sheet exhibits electric resistance lower than or equal to 10 kΩ), the measured values indicate lower electric resistance than the theoretical values due to an uneven distribution, described in FIG. 1B, of how easy or difficult it is for electricity to pass between the first flow channel and the second flow channel. For example, it is assumed that the electric resistance of the cell sheet is for example 310Ω; however, according to FIG. 1C, this value falls under a large margin of error. Since electric resistance that is lower than the electric resistance to be measured is thus measured, the cell culture chip according to the comparative example may be inaccurate in measured values.

Figure 2A:
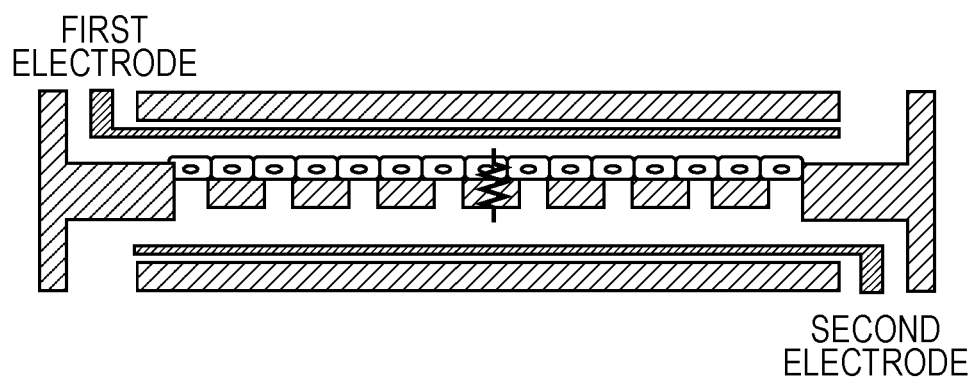
FIG. 2A is a first conceptual diagram of a cell culture chip according to an embodiment.

To address this problem, the present disclosure provides, for example, a cell culture chip that is capable of solving the problem. FIG. 2A is a first conceptual diagram of a cell culture chip according to an embodiment. This drawing shows the cell culture chip according to the embodiment in correspondence with the conceptual diagram of the cell culture chip according to the comparative example described with reference to FIG. 1A. In the cell culture chip according to the present embodiment as compared with the cell culture chip according to the comparative example, as shown in FIG. 2A, each electrode extends along the direction of extension of the flow channels, and the distance between the first electrode and the second electrode is kept substantially constant at any point on the flow channels. This reduces the influence of the electric resistance of the culture media, thus making a more accurate measurement of the electric resistance of the cell sheet possible.

Figure 2B:
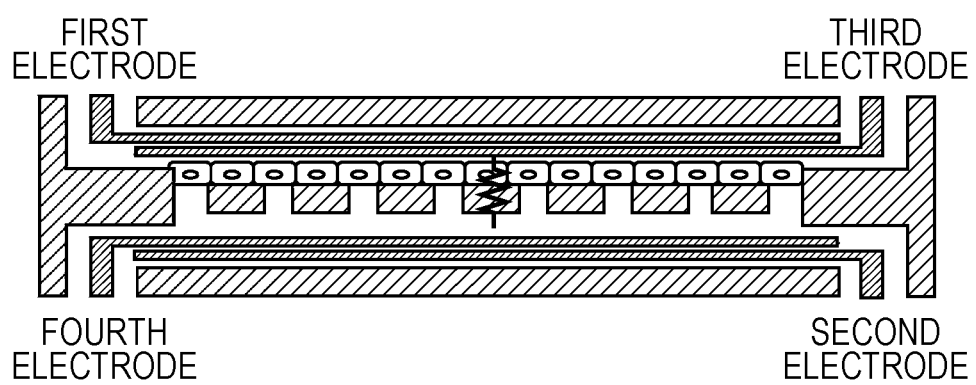
FIG. 2B is a second conceptual diagram of a cell culture chip according to the embodiment.

Further, FIG. 2B is a second conceptual diagram of a cell culture chip according to an embodiment. The cell culture chip shown in FIG. 2B further comprises a third electrode and a fourth electrode in addition to components which are similar to those shown in FIG. 2A. The distance between the third electrode and the fourth electrode is kept substantially constant at any point on the flow channels. Accordingly, the cell culture chip shown in FIG. 2B reduces the influence of the electric resistance of the culture media between the first electrode and the second electrode and between the third electrode and the fourth electrode, thus making a more accurate measurement of the electric resistance of the cell sheet possible with a four-terminal system.

Although the embodiments to be described below are described by taking, as an example, a cell culture chip, shown in FIG. 2B, that comprises four electrodes, namely first to fourth electrodes, the present disclosure can also be achieved by with a cell culture chip, shown in FIG. 2A, that comprises two electrodes, namely first and second electrodes.

The following describes embodiments of the present disclosure with reference to the drawings.

It should be noted that the embodiments to be described below illustrate general or specific examples. The numerical values, shapes, materials, constituent elements, placement and topology of constituent elements, steps, orders of steps, or other features that are shown in the following embodiments are merely examples and are not intended to limit the scope of claims. Further, those of the constituent elements in the following embodiments which are not recited in an independent claim representing the most generic concept are described as optional constituent elements.

It should be noted that the drawings are not necessarily strict illustrations. In the drawings, substantially the same components are given the same reference signs, and a repeated description may be omitted or simplified. Further, although the following description is given with reference to an X axis, a Y axis, and a Z axis that are orthogonal to one another, these axes are not intended to define directions during use of a cell culture chip or other devices.

Further, terms such as "parallel" used herein to show the way in which elements are interrelated, terms such as "rectangular" used herein to show the shape of an element, and ranges of numerical values used herein are not expressions that represent only exact meanings but expressions that are meant to also encompass substantially equivalent ranges, e.g. differences such as errors of approximately several percent.

Embodiments

Cell Culture Apparatus

Figure 3:
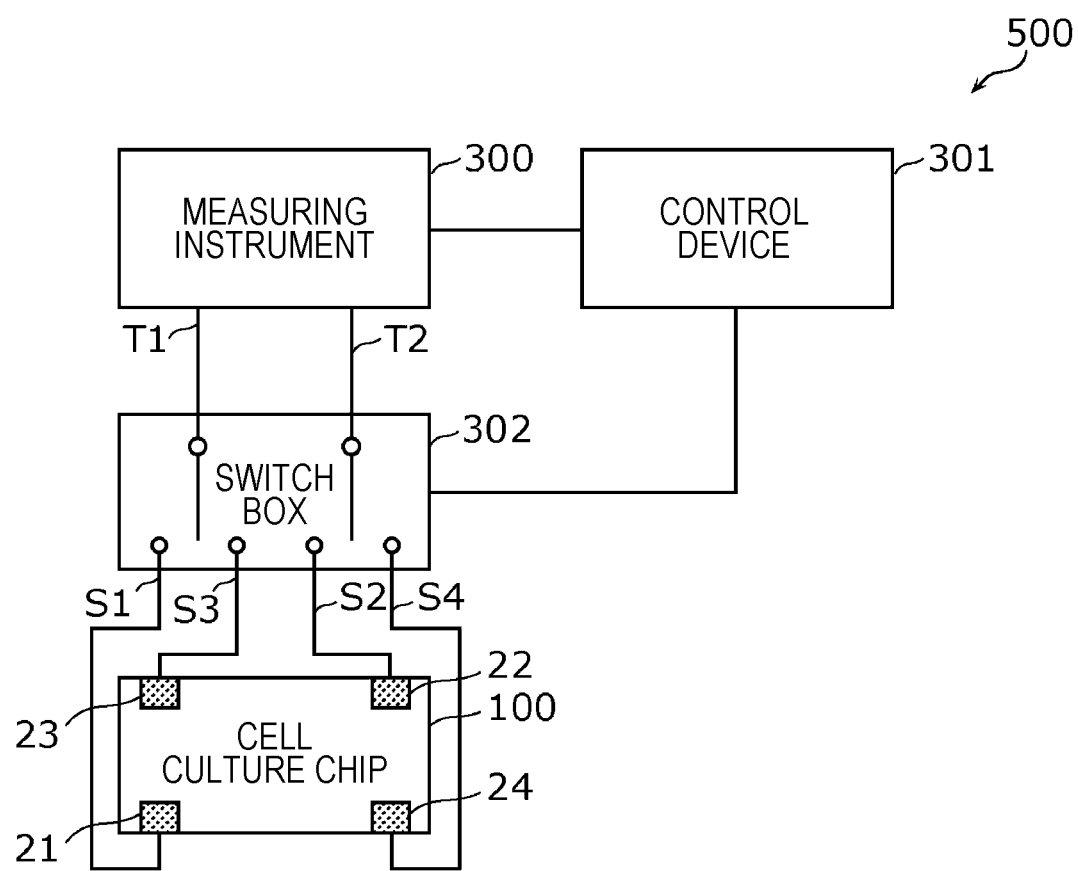
FIG. 3 is a block diagram showing a cell culture apparatus according to the embodiment.

First, a cell culture apparatus according to an embodiment is described. FIG. 3 is a block diagram showing a cell culture apparatus 500 according to the present embodiment.

As shown in FIG. 3, the cell culture apparatus 500 according to the present embodiment comprises a measuring instrument 300, a control device 301, a switch box 302, and a cell culture chip 100.

The cell culture chip 100 is a device that is equivalent to a culture tank that is used in culturing cells with the cell culture apparatus 500. The cell culture apparatus 500 calculates, by measuring electric resistance with electrodes, the electric resistance of cells being cultured in the cell culture chip 100 and estimates the state of the cells on the basis of the electric resistance thus calculated of the cells. Accordingly, the cell culture chip 100 is provided with measuring electrodes for calculating the electric resistance of the cells being cultured. Specifically, the cell culture chip 100 comprises a first electrode 21, a second electrode 22, a third electrode 23, and a fourth electrode 24 as the electrodes. A configuration of the cell culture chip 100 will be described in detail later.

The measuring instrument 300 is a measuring device for calculating the electric resistance of the cells being cultured. Specifically, the measuring instrument 300 is a resistance meter that has terminals T1 and T2 to which two electrodes between which electric resistance is to be measured are connected and that measures electric resistance between the two electrodes electrically connected to the terminals T1 and T2. The measuring instrument 300, for example, measures AC impedance and a phase difference between the terminal T1 and the terminal T2 and calculates electric resistance between the terminal T1 and the terminal T2 on the basis of a result of the measurement. In this case, the electric resistance thus calculated is measured electric resistance.

The control device 301 is a processing device that calculates the electric resistance of the cells on the basis of the electric resistance thus measured between the electrodes. Further, the control device 301 is also a processing device that sends, to the switch box 302, a control signal for switching electrical connections between the measuring instrument 300 and the electrodes provided in the cell culture chip 100. The control device 301 is implemented, for example, by a processor and a memory connected to the processor as a computer that executes a program for carrying out the aforementioned function. Alternatively, the control circuit 301 may be a dedicated circuit that is capable of executing the aforementioned process.

The switch box 302 receives a control signal sent from the control device 301 and, on the basis of the control signal, switches between a connection with a connection terminal S1 to which the terminal T1 and the first electrode 21 are connected and a connection with a connection terminal S3 to which the terminal T1 and the third electrode 23 are connected. Further, the control device 301 switches between a connection with a connection terminal S2 to which the terminal T2 and the second electrode 22 are connected and a connection with a connection terminal S4 to which the terminal T2 and the fourth electrode 24 are connected. That is, the switch box 302 comprises switches corresponding separately to each of the terminals T1 and T2 and performs switching between the switches on the basis of a control signal. In this way, in the present embodiment, a measurement of electric resistance is conducted while combinations of electrodes to be measured is switched therebetween.

The cell culture apparatus 500 may further comprise fluid control devices such as a storage tank and a pump for a culture medium used in culture, environment control devices, such as a gas chamber and a heat regulator, that adapt the cell culture chip 100 to a predetermined culture condition, or other devices, although these devices are not illustrated. Alternatively, the culture of cells may be conducted with these devices prepared separately from the cell culture apparatus 500.

Figure 4:
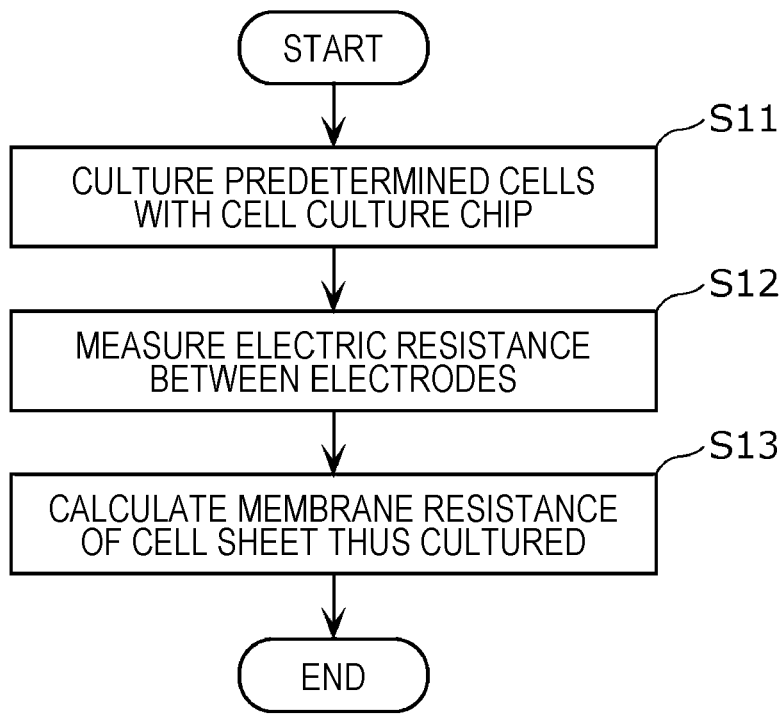
FIG. 4 is a flow chart showing a cell culture method according to the embodiment.

Further, the culture of cells with the cell culture apparatus 500 is conducted in the following way. FIG. 4 is a flow chart showing a cell culture method according to the embodiment. As shown in FIG. 4, first, predetermined cells are cultured with the cell culture chip 100 (culturing step S11). Note here that the predetermined cells that are cultured with the cell culture chip 100 may be of any type. Further, as will be described in detail later, the cell culture chip 100 has two flow channels, namely the first flow channel and the second flow channel, thus making it possible to culture cells of different types separately in each of the flow channels. For example, the first flow channel and the second flow channel may be combined to construct a respiratory organ model by culturing lung cells in the first flow channel and culturing vascular cells in the second flow channel. Further, for example, a blood-brain barrier passage test model may be constructed by culturing blood-brain barrier cells in the first flow channel and culturing cerebral nerve cells in the second flow channel.

Further, the cells that are cultured in each flow channel do not need to be of one type but may be of a combination of a plurality of types. The cells that are cultured in each flow channel may be subjected to mixed culture of different types of cell at appropriate ratios according to a cellular architecture, such as an organ, that needs to be reproduced in the flow channel. The cells thus cultured forms a sheet-shaped structure through intercellular junctions such as tight junctions. Such a sheet-shaped structure allows the cells thus cultured to have resistance (i.e. membrane resistance) over an area extending from a first principal surface of the sheet to a second principal surface. Fluids such as media may be passed through the first flow channel and the second flow channel. Fluids such as blood and lymph always circulate through a living body, and the growth and degeneration of cells depending on the circulation repeatedly take place. Accordingly, passing a fluid through such a flow channel makes it possible to culture and evaluate cells with reproduction of a condition close to a condition of a living body.

Then, the measuring instrument 300 measures electric resistance between electrodes forming a combination by being electrically connected to each other as a result of switching of a switch of the switch box 302 on the basis of a control signal sent from the control device 301 (step S12). Data representing the electric resistance thus measured is stored in a storage device such as a memory by the control device 301.

When data representing electric resistance needed to calculate the membrane resistance of a cell sheet has been stored in the storage device, the control device 301 calculates the membrane resistance of the cell sheet (step S13). For example, in the present embodiment, data representing electric resistance needed to calculate the membrane resistance of a cell sheet is data representing electric resistance between the first electrode and the second electrode ($R_{12}$), between the first electrode and the third electrode ($R_{13}$), between the second electrode and the fourth electrode ($R_{24}$), and between the third electrode and the fourth electrode ($R_{34}$). In the present embodiment, these four pieces of data are used to calculate the electric resistance of a cell sheet according to the following Formula (1):

$$\text{Electric resistance of cell sheet} = \frac{(R_{12} + R_{34}) - (R_{13} + R_{24})}{2} \quad (1)$$

According to the foregoing Formula (1), a more accurate calculation of the electric resistance of a cell sheet is performed by subtracting resistance components that may be included as errors in the electric resistance between the electrodes. Depending on how accurate a user of the cell culture apparatus 500 requires electric resistance to be, the calculation of the electric resistance of a cell sheet according to the foregoing Formula (1) may not be essential. In such a case, the electric resistance of a cell sheet may be electric resistance measured between the first electrode and the second electrode. That is, in the present embodiment, the cell culture chip 100 needs only comprise the first electrode and the second electrode, and the third electrode and the fourth electrode may be provided only in a case where more accurate electric resistance of a cell sheet is required.

By thus calculating the electric resistance of a cell sheet formed by cells cultured, an estimation of the state of the cells is allowed. The present disclosure allows a more accurate calculation of the electric resistance of cells and therefore allows a more accurate estimation of the state of cells. A combination of steps S12 and S13 is also referred to as a "measuring step" of measuring the electric resistance of cells.

Cell Culture Chip

Figure 5A:
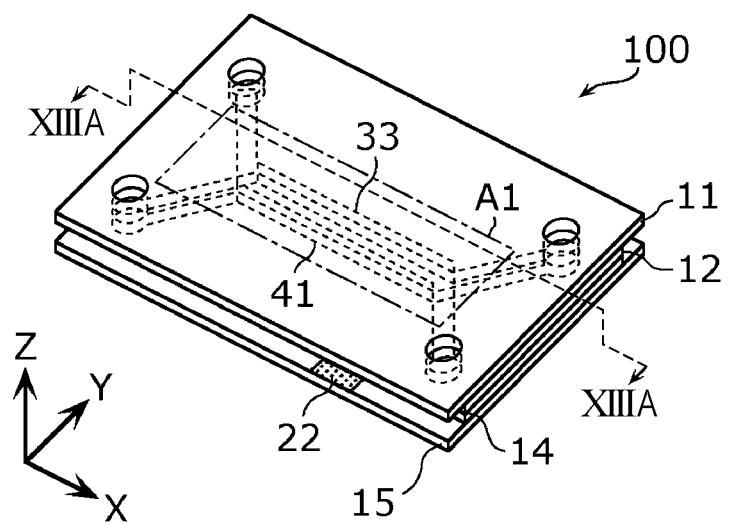
FIG. 5A is a perspective view of a cell culture chip according to the embodiment.
Figure 5B:
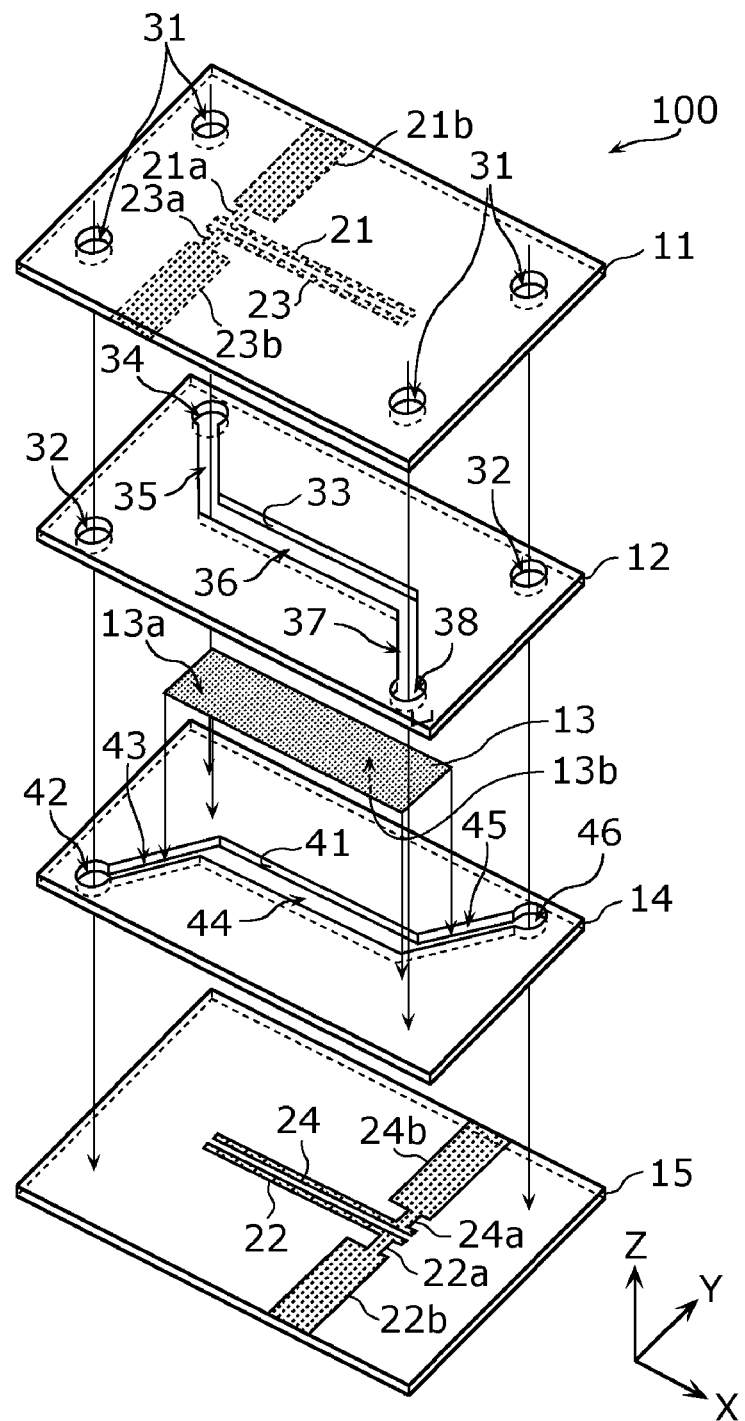
FIG. 5B is an exploded perspective view of the cell culture chip according to the embodiment.

The following gives a more detailed description of the cell culture chip 100 according to the present embodiment. FIG. 5A is a perspective view of the cell culture chip 100 according to the embodiment. Further, FIG. 5B is an exploded perspective view of the cell culture chip 100 according to the embodiment.

The cell culture chip 100 according to the present embodiment comprises a body, a cell separation membrane 13, the first electrode 21, the second electrode 22, the third electrode 23, and the fourth electrode 24. Further, the body has a laminated structure in which a first substrate 11, a first bulkhead layer 12, a second bulkhead layer 14, and a second substrate 15 have been stacked in this order along a predetermined direction (in the drawing, a direction parallel with the Z axis). The first substrate 11, the first bulkhead layer 12, the second bulkhead layer 14, and the second substrate 15 each have principal surfaces parallel to an X-Y plane. The first electrode 21 and the third electrode 23 are formed on a principal surface of the first substrate 11 that faces a negative side of the Z axis. The second electrode 22 and the fourth electrode 24 are formed on a principal surface of the second substrate 15 that faces a positive side of the Z axis. Further, the cell separation membrane 13 is sandwiched between the first and second bulkhead layers 12 and 14 of the body.

The first substrate 11 is a plate-shaped member formed using a material such as glass. The material of the first substrate 11 is not limited to glass, and any material such as resin or ceramic may be used. Further, the first substrate 11 is made of a non-cytotoxic material, as the first substrate 11 touches cells when the cells are cultured. The same applies to all of the following constituent elements that constitute the cell culture chip 100. In the embodiment, the first substrate 11 is in the shape of a plate having a rectangular principal surface on which the first electrode 21 and the third electrode 23 are formed.

Furthermore, the first substrate 11 has formed thereon a first contact point 21b through which to make a connection with the switch box 302 and a first lead 21a that electrically connects the first electrode 21 with the first contact point 21b. The first electrode 21, the first lead 21a, and the first contact point 21b are integrally formed by performing a photolithography patterning process on an indium tin oxide (ITO) film formed by sputtering on the first substrate 11. The first electrode 21, the first lead 21a, and the first contact point 21b may be formed with another publicly-known technique. Further, not an ITO film but an electrically-conductive thin film of gold, platinum, or other substances may be used for the first electrode 21, the first lead 21a, and the first contact point 21b. Instead of being in the shapes of flat plates, formed by a patterning process, that have principal surfaces, the first electrode 21 and the third electrode 23 may be wire cabling materials disposed on the first substrate 11.

Furthermore, the first substrate 11 has formed thereon a third contact point 23b through which to make a connection with the switch box 302 and a third lead 23a that electrically connects the third electrode 23 with the third contact point 23b. The third electrode 23, the third lead 23a, and the third contact point 23b are integrally formed by performing a photolithography patterning process on an indium tin oxide (ITO) film formed by sputtering on the first substrate 11. The third electrode 23, the third lead 23a, and the third contact point 23b may be formed with another publicly-known technique. Further, not an ITO film but an electrically-conductive thin film of gold, platinum, or other substances may be used for the third electrode 23, the third lead 23a, and the third contact point 23b.

A combination of the first electrode 21, the first lead 21a, and the first contact point 21b and a combination of the third electrode 23, the third lead 23a, and the third contact point 23b are substantially axisymmetrically formed at a distance from each other about a line of symmetry formed by a center line dividing the first substrate 11 into two equal parts in a direction parallel with the Y axis. Further, the first contact point 21b and the third contact point 23b are disposed closer to a negative side of a direction parallel with the X axis than a center line dividing the first substrate 11 into two equal parts in the direction parallel with the X axis.

The first substrate 11 needs only be formed by an insulating material so that the aforementioned electrically-conductive electrodes or other terminals do not become short-circuited. Further, the first substrate 11 is provided with holes 31 penetrating the first substrate 11 along the predetermined direction so as to lead to the first bulkhead layer 12 stacked on the first substrate 11. In the present embodiment, the number of holes 31 that are provided is, but is not limited to, 4. In a case where part of the first bulkhead layer 12 does not overlap the first substrate 11 and is exposed or other cases, it is possible to lead directly to the first bulkhead layer 12 without passing through the holes 31 of the first substrate 11.

The first bulkhead layer 12 is a plate-shaped member formed with silicone resin. The first bulkhead layer 12 has a first through-hole at least part of which is penetrating the first bulkhead layer 12 in a thickness direction (i.e. the direction parallel with the Z axis) in correspondence with the first and third electrodes 21 and 23 formed on the first substrate 11. As will be described in detail later, the first through-hole corresponds to a first flow channel 33. Both ends of the first through-hole correspond to two of the holes 31 formed in the first substrate 11. Further, the first bulkhead layer 12 is provided with holes 32 corresponding to the remaining two holes 31 and penetrating the first bulkhead layer 12 in the thickness direction so as to lead to the second bulkhead layer 14 stacked on the first bulkhead layer 12. As is the case with the holes 31, the number of holes 32 may be smaller than 2.

The cell separation membrane 13, which is generally called "membrane", is a membrane-shaped member having a first principal surface 13a facing the first bulkhead layer 12 and a second principal surface 13b facing the second bulkhead layer 14. The cell separation membrane 13 is formed with a porous resin material, and has formed therein a large number of through-holes of a predetermined pore diameter penetrating the first principal surface 13a and the second principal surface 13b, which face away from each other. Note here that the predetermined pore diameter is the average of the pore diameters of a large number of through-holes that are not uniform in pore diameter. Further, the predetermined pore diameter is set to be sufficiently smaller than the cell diameters of cells that are cultured with the cell culture chip 100.

Accordingly, the cell separation membrane 13 is a semi-permeable membrane that inhibits cells that are sufficiently larger than the predetermined pore diameter from passing from the first principal surface 13a to the second principal surface 13b or from the second principal surface 13b to the first principal surface 13a and allows solution components (such as medium components) that are smaller than the predetermined pore diameter to pass from the first principal surface 13a to the second principal surface 13b or from the second principal surface 13b to the first principal surface 13a. Further, in a case where cells that are cultured in the cell culture chip 100 are adherent cells, the cell separation membrane 13 also functions as a foothold for the cells. Accordingly, the cell separation membrane 13 needs only be made of a selected material to which the cells that are cultured can adhere. The cell separation membrane 13 is disposed in a place corresponding to the first through-hole and the after-mentioned second through-hole, and is sandwiched between the first bulkhead layer 12 and the second bulkhead layer 14 outside the first through-hole and the second through-hole in a plan view as seen from an angle parallel with a direction of stacking.

This allows the first through-hole and the second through-hole to be demarcated by the cell separation membrane 13 in a place where the first through-hole and the second through-hole overlap.

In this way, the first flow channel 33, which has a first main flow channel 36 demarcated by the principal surface of the first substrate 11 on which the first electrode 21 and the third electrode 23 have been formed, the first through-hole, and the first principal surface 13a, is formed. In other words, the first main flow channel 36 is formed by the first through-hole between the first substrate 11 and the cell separation membrane 13. The first main flow channel 36 is a portion of the first flow channel 33 formed by the first through-hole. The first electrode 21 and the third electrode 23 are in contact with the first flow channel 33 thus demarcated, particularly the first main flow channel 36, and extend through the first main flow channel 36 along the first main channel 36. Further, the first flow channel 33 has a first inlet 34 formed at a first end thereof corresponding to a hole 31 and a first outlet 38 at a second end thereof corresponding to a hole 31, and communicates with an area outside the cell culture chip 100 via those holes 31. Further, the first flow channel 33 has a first inflow channel 35 leading from the first inlet 34 to the first main flow channel 36 and a first outflow channel 37 leading from the first outlet 38 to the first main flow channel 36. The first inflow channel 35 and the first outflow channel 37 are demarcated by the second bulkhead layer 14 instead of the cell separation membrane 13 with respect to the first main flow channel 36.

The second bulkhead layer 14 is a plate-shaped member formed with silicone resin. The second bulkhead layer 14 has the second through-hole, at least part of which is penetrating the second bulkhead layer 14 in the thickness direction (i.e. the direction parallel with the Z axis) in correspondence with the second and fourth electrodes 22 and 24 formed on the second substrate 15. As will be described in detail later, the second through-hole corresponds to a second flow channel 41. Both ends of the second through-hole correspond to holes 31 formed in the first substrate 11 and holes 32 formed in the first bulkhead layer 12.

The second substrate 15 is a plate-shaped member formed using a material such as glass. The material of the second substrate 15 is not limited to glass, but any material such as resin or ceramic may be used. In the embodiment, the second substrate 15 is in the shape of a plate having a rectangular principal surface on which the second electrode 22 and the fourth electrode 24 are formed.

Furthermore, the second substrate 15 has formed thereon a second contact point 22b through which to make a connection with the switch box 302 and a second lead 22a that electrically connects the second electrode 22 with the second contact point 22b. The second electrode 22, the second lead 22a, and the second contact point 22b are integrally formed by performing a photolithography patterning process on an indium tin oxide (ITO) film formed by sputtering on the second substrate 15. The second electrode 22, the second lead 22a, and the second contact point 22b may be formed with another publicly-known technique. Further, not an ITO film but an electrically-conductive thin film of gold, platinum, or other substances may be used as the second electrode 22, the second lead 22a, and the second contact point 22b. Instead of being in the shapes of flat plates, formed by a patterning process, that have principal surfaces, the second electrode 22 and the fourth electrode 24 may be wire cabling materials disposed on the second substrate 15.

Furthermore, the second substrate 15 has formed thereon a fourth contact point 24b through which to make a connection with the switch box 302 and a fourth lead 24a that electrically connects the fourth electrode 24 with the fourth contact point 24b. The fourth electrode 24, the fourth lead 24a, and the fourth contact point 24b are integrally formed by performing a photolithography patterning process on an indium tin oxide (ITO) film formed by sputtering on the second substrate 15. The fourth electrode 24, the fourth lead 24a, and the fourth contact point 24b may be formed with another publicly-known technique. Further, not an ITO film but an electrically-conductive thin film of gold, platinum, or other substances may be used for the fourth electrode 24, the fourth lead 24a, and the fourth contact point 24b.

A combination of the second electrode 22, the second lead 22a, and the second contact point 22b and a combination of the fourth electrode 24, the fourth lead 24a, and the fourth contact point 24b are substantially axisymmetrically formed at a distance from each other about a line of symmetry formed by a center line dividing the second substrate 15 into two equal parts in the direction parallel with the Y axis. Further, the second contact point 22b and the fourth contact point 24b are disposed closer to a positive side of the direction parallel with the X axis than a center line dividing the second substrate 15 into two equal parts in the direction parallel with the X axis. As a result, the first contact point 21b and the fourth contact point 24b do not overlap in a plan view as seen from an angle parallel with the direction of stacking, and the second contact point 22b and the third contact point 23b do not overlap in a plan view as seen from an angle parallel with the direction of stacking.

The second substrate 15 needs only be formed with an insulating material so that the aforementioned electrically-conductive electrodes or other terminals do not become short-circuited.

In this way, the second flow channel 41, which has a second main flow channel 44 demarcated by the principal surface of the second substrate 15 on which the second electrode 22 and the fourth electrode 24 have been formed, the second through-hole, and the second principal surface 13b, is formed. In other words, the second main flow channel 44 is formed by the second through-hole between the second substrate 15 and the cell separation membrane 13. The second main flow channel 44 is a portion of the second flow channel 41 formed by the second through-hole. The second electrode 22 and the fourth electrode 24 are in contact with the second flow channel 41 thus demarcated, particularly the second main flow channel 44, and extend through the second main flow channel 44 along the second main channel 44. Further, the first main flow channel 36 and the second main flow channel 44 overlap each other in a plan view as seen from an angle parallel with the direction of stacking, and the flow channels are demarcated via the cell separation membrane 13.

In other words, the cell separation membrane 13 is disposed between the first flow channel 33 and the second flow channel 41 so that the first main flow channel 36 of the first flow channel 33 is located on the first principal surface 13a and the second main flow channel 44 of the second flow channel 41 is located on the second principal surface 13b. Accordingly, components, such as medium components flowing through the flow channels, that are smaller than the predetermined pore diameter can be exchanged between the first main flow channel 36 and the second main flow channel 44 via the cell separation membrane 13. Further, as is the case with medium components, electrolytes can be exchanged between the first main flow channel 36 and the second main flow channel 44; therefore, the first main flow channel 36 and the second main flow channel 44 are electrically connected by medium components or other components flowing through the flow channels.

Further, the second flow channel 41 has a second inlet 42 formed at a first end thereof corresponding to the hole 31 a hole 32 and a second outlet 46 at a second end thereof corresponding to the hole 31 and the hole 32, and communicates with the area outside the cell culture chip 100 via those holes 31 and 32. Further, the second flow channel 41 has a second inflow channel 43 leading from the second inlet 42 to the second main flow channel 44 and a second outflow channel 45 leading from the second outlet 46 to the second main flow channel 44. The second inflow channel 43 and the second outflow channel 45 are demarcated by the first bulkhead layer 12 instead of the cell separation membrane 13 with respect to the second main flow channel 44.

That is, in a plan view as seen from an angle parallel with the direction of stacking, the first inflow channel 35 and the second inflow channel 43 do not overlap, and the first outflow channel 37 and the second outflow channel 45 do not overlap. As a result, in the first inflow channel 35 and the first outflow channel 37, a part of the first flow channel 33 is formed by a principal surface of the second bulkhead layer 14 in which the second through-hole is not formed. Further, in the second inflow channel 43 and the second outflow channel 45, a part of the second flow channel 41 is formed by a principal surface of the first bulkhead layer 12 in which the first through-hole is not formed.

Figure 6:
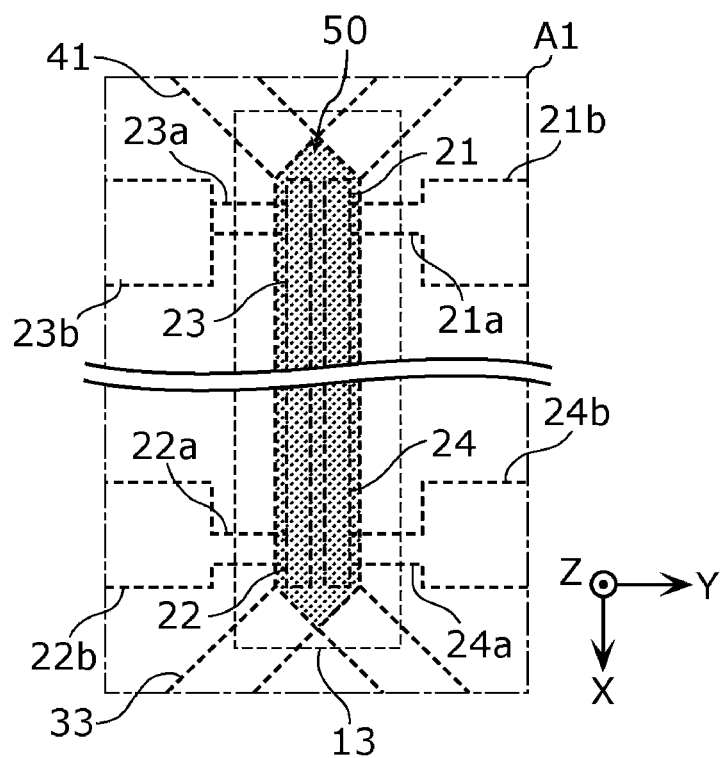
FIG. 6 is a plan view in which an area A1 indicated by dot-and-dash lines in FIG. 1A is seen from an angle parallel with a direction of stacking.

FIG. 6 is a plan view in which an area A1 indicated by dot-and-dash lines in FIG. 1A is seen from an angle parallel with the direction of stacking. In FIG. 6, positional relationships among the first to fourth electrodes 21 to 24, the first to fourth leads 21a to 24a, the first to fourth contact points 21b to 24b, the first flow channel 33, the second flow channel 41, and the cell separation membrane 13 are indicated by using dashed lines to indicate the positions that they would assume if they were seen through.

As shown in the drawing, the first flow channel 33 and the second flow channel 41 overlap each other in the first main flow channel 36 and the second main flow channel 44. The cell separation membrane 13 have the first principal surface 13a and the second principal surface 13b, which are larger than the entire first main flow channel 36 or the entire second main flow channel 44, and extends to outside the first main flow channel 36 and the second main flow channel 44 when seen from an angle parallel with the predetermined direction. As a result, in a region where the first main flow channel 36 and the second main flow channel 44 overlap, the cell separation membrane 13 separates the first main flow channel 36 and the second main flow channel 44 from each other by inhibiting them from being brought into contact with each other. By this configuration of the cell separation membrane 13, the flow channels are demarcated in the foregoing manner. Cells separated into each flow channel by the cell separation membrane 13 are cultured here. The region where the first main flow channel 36 and the second main flow channel 44 overlap (i.e. a region where the first flow channel 33 and the second flow channel 41 overlap) when seen from an angle parallel with the direction of stacking is defined as a cell culture region 50.

The first to fourth electrodes 21 to 24 extend through the cell culture region 50 along the cell culture region 50. The first to fourth electrodes 21 to 24 extend along the cell culture region 50 over a range longer than 50%, longer than 75%, and longer than 90% of the length of the cell culture region 50. The length of the cell culture region 50 is a length between vertices of a flat hexagon in the drawing that are farthest from each other. Further, only one first electrode 21, one second electrode 22, one third electrode 23, and one fourth electrode 24 are disposed in the cell culture region 50. Further, in the drawing, the first to fourth electrodes 21 to 24 are disposed so that the first electrode 21 and the fourth electrode 24 overlap and the second electrode 22 and the third electrode 23 overlap.

The first electrode 21 and the third electrode 23 are formed with indium tin oxide (ITO) as mentioned above, and are transparent. Further, the first substrate 11 too is formed with a transparent material such as glass. With such a configuration, the first substrate 11, the first electrode 21, and the third electrode 23 are transparent, so that the first bulkhead layer 12 is seen through. This makes it possible to also visually observe cells that are cultured in the first flow channel 33. It is not essential that the first substrate 11, the first electrode 21, and the third electrode 23 be constituted by transparent materials, and the first substrate 11, the first electrode 21, and the third electrode 23 may be constituted by opaque materials. Further, similarly, the second substrate 15, the second electrode 22, and the fourth electrode 24 may be transparent, or may be opaque.

The placement, sizes, or other features of the first to fourth electrodes 21 to 24, including the lengths of the first to fourth electrodes 21 to 24 with respect to the cell culture region 50, are described in more detail, together with results of various types of simulation shown in FIGS. 7A to 9. In the following description, the first to fourth electrodes 21 to 24 may be expressed simply as "electrodes" when they are referred to without particular distinction.

For example, a predetermined standard of measurement is required in the measurement of the electric resistance of cultured cells with such a cell culture apparatus 500 as that described above. For example, on the basis of the reliability or other qualities of a general measured value, the standard of measurement is set as an error condition in which an error rate falls within the range ±20% or other ranges. As described in the beginning, in the present embodiment, a measurement is carried out by electrodes formed along the direction of extension of flow channels. In particular, various types of condition derived from results of simulations performed on the configuration of the cell culture chip 100 that satisfies the standard of measurement as described above are described. As an example of a standard of measurement, an error rate falling within a range of ±20% is used here. Accordingly, the numerical values or other values used in the following description are merely examples, and in a case where a different standard of measurement is required by a user of the cell culture chip 100 or the cell culture apparatus 500, numerical values or other values appropriate to the standard of measurement may be set.

Figure 7A:
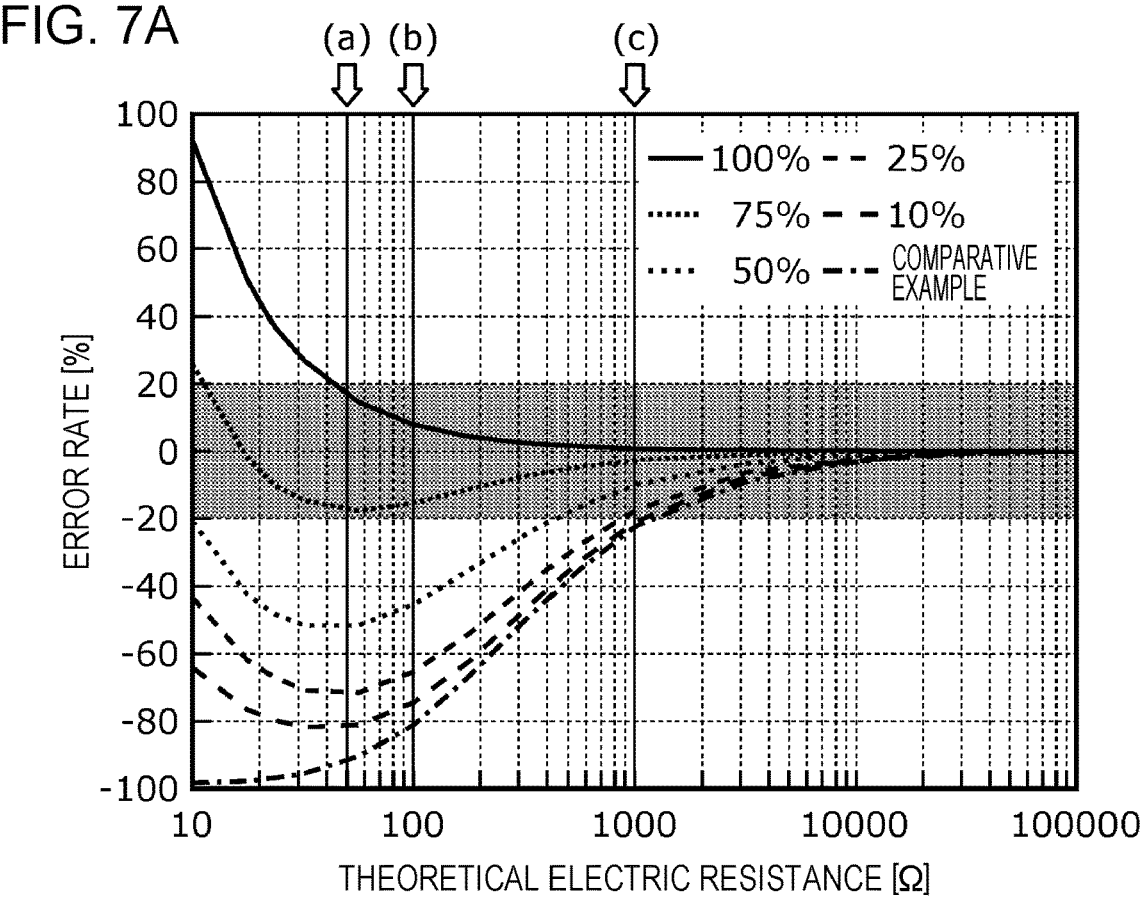
FIG. 7A is a first diagram showing results of simulations regarding lengths of electrodes according to the embodiment.
Figure 7B:
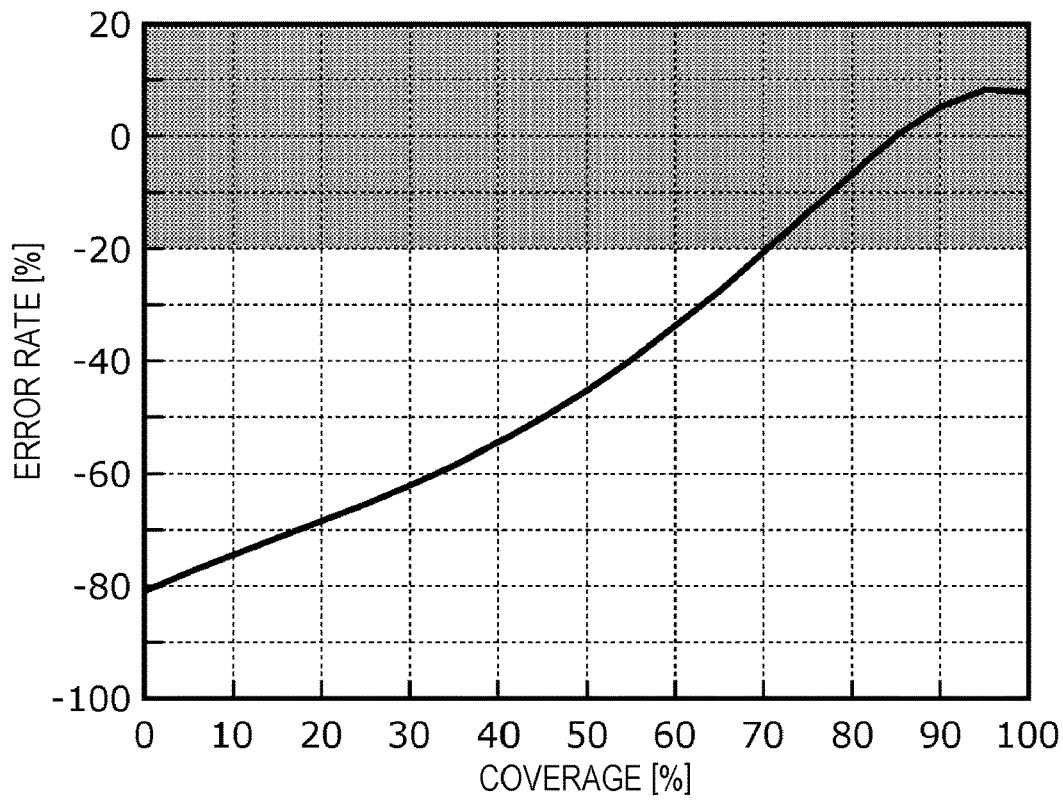
FIG. 7B is a second diagram showing results of simulations regarding the lengths of the electrodes according to the embodiment.

FIG. 7A is a first diagram showing results of simulations regarding the lengths of the electrodes according to the embodiment. Further, FIG. 7B is a second diagram showing results of simulations regarding the lengths of the electrodes according to the embodiment. FIG. 7A shows error rates in measured value (or simulated value) on simulations run on theoretical values of electric resistance of cultured cells serving as targets of measurement. Further, FIG. 7A shows results of simulations run on each of electrodes of a plurality of lengths with regard to this relationship between theoretical values and error rates.

The lengths of the electrodes here are described. The lengths of the electrodes as relative sizes with respect to a region (hereinafter also referred to as "electric field region") in the first and second flow channels 33 and 41 where an electric field is comparatively uniformly formed by the electrodes are shown here in percentages (hereinafter also referred to as "coverages"). The electric field region is specifically a region having a space spanning the first flow channel 33 and the second flow channel 41 in a place where the first flow channel 33 and the second flow channel 41 extend over each other. In the electric field region, the first electrode 21 and the third electrode 23, which extend along the first flow channel 33, are disposed, and the second electrode 22 and the fourth electrode 24, which extend along the second flow channel 41, are disposed. Further, the first electrode 21, the second electrode 22, the third electrode 23, and the fourth electrode 24 extend along the first flow channel 33 or the second flow channel 41 in the electric field region. The electric field region here is simplistically treated as a region that has a uniform cross-sectional shape (e.g. a continuously isometric rectangular cross-section) when cut along a cutting plane orthogonal to the direction of extension of the first main flow channel 36 and the second main flow channel 44 that agrees with the direction of extension of the first to fourth electrodes 21 to 24, which are used in electric field formation.

That is, the electric field region is a region having the geometry of a rectangle in a plan view as seen from an angle parallel with the direction of stacking of the body, with the rectangular consisting of four sides including, as opposite sides, the longest two sides of the hexagonal cell culture region 50 described above with reference to FIG. 6. Further, the electric field region is in the shape of a quadrangular prism having a height spanning the first flow channel 33 and the second flow channel 41 as noted above. This height is equivalent to a total of the thicknesses of the first bulkhead layer 12, the second bulkhead layer 14, and the cell separation membrane 13; however, since the thickness of the cell separation membrane 13 is sufficiently small, can be said to be substantially equivalent to the thicknesses of the first bulkhead layer 12 and the second bulkhead layer 14.

In the present embodiment, appropriate lengths of the electrodes are derived according to simplistic calculation by thus performing simulations on a simplistic electric field region. In actuality, an electric field is formed all over the first flow channel 33 and the second flow channel 41. Accordingly, the electric field region may be a region reaching all parts of the first flow channel 33 and the second flow channel 41, or may be a region corresponding to the hexagonal prismatic shape of the cell culture region 50, and the flow channel shape of the cell culture chip 100 may be designed so that main portions of the first flow channel 33 and the second flow channel 41 can be covered by the simple-shaped electric field region.

The lengths of the electrodes that constitute the cell culture chip 100 can be defined by thus using the aforementioned coverages as numerical values that relatively indicate the lengths of the electrodes with respect to the predefined length of the electric field region on the basis of the error rates in simulated value. The length of the electric filed region is a length in the direction of extension of the electric field region, which extends in a manner similar to that in which the first flow channel 33 and the second flow channel 41 extend as flow channels. Further, the lengths of the electrodes are lengths in the direction of extension of the first to fourth electrodes 21 to 24, which extend along the first flow channel 33 and the second flow channel 41. The direction of extension of the electric field direction agrees with the direction of extension of the first to fourth electrodes 21 to 24, and the length of each of the first to fourth electrodes 21 to 24 agrees with the length of the other.

Accordingly, FIG. 7A shows error rates in simulated value with respect to values of theoretical electric resistance in electrodes with coverages of 100%, 75%, 50%, 25%, and 10% as coverages for defining the lengths of the electrodes. Further, FIG. 7A also shows error rates in simulated value with respect to values of theoretical electric resistance in electrodes of a cell culture chip configured as shown in FIG. 1A as a comparative example. The electrodes of the cell culture chip configured as shown in FIG. 1A are not electrodes extending along flow channels as in the case of the embodiment but are electrodes that are electrically connected to one another via fluids that are passed through the flow channels.

As shown in FIG. 7A, such a tendency is observed at any coverage that a higher error rate is measured at lower electric resistance of cultured cells serving as a target of measurement. A high error rate means an error rate having a great absolute value. That is, it can be said that an error rate farther away from an error rate of 0% in a positive or negative direction is higher. Values of electric resistance of cultured cells vary, for example, according to cell type and cell state (or growing condition). Accordingly, an appropriate coverage needs only be selected, for example, according to the cell type and cell state of cultured cells. For example, as cells for which the cell culture chip 100 is used, the case of a value of electric resistance (i.e. 100Ω) indicated by an arrow (b) in the drawing is described with reference to FIG. 7B. FIG. 7B shows a graph representing a change in error rate in simulated value with respect to a change in coverage, with the value of electric resistance being fixed at 100Ω). In the drawing, the dot-hatching represents a range of error rates in simulated value that satisfies the standard of measurement. The same applies to FIG. 7A and to FIGS. 8 and 9, which will be described later.

As shown in the drawing, it is found that in a case where the electric resistance of cultured cells is 100Ω), error rates in simulation value that satisfy the standard of measurement are obtained in a range where the value of coverage is greater than or equal to 70% and less than or equal to 100%. Considering, with continued reference to FIG. 7A, that higher electric resistance of a target of measurement leads to a lower error rate, a more satisfactory measurement can be carried out by a cell culture chip 100 having electrodes with a coverage higher than or equal to 70%, provided a cell type, a cell state, or other conditions assume that the electric resistance of cultured cells is higher than or equal to 100Ω.

By the same token, for example, in the case of measurement of an electric resistance of 50Ω (indicated by an arrow (a) in the drawing), which is substantially the smallest value that cultured cells are assumed to have, a more satisfactory measurement can be carried out by a cell culture chip 100 having electrodes with a coverage higher than or equal to 75%. Further, for example, in the case of measurement of an electric resistance of 1,000Ω (indicated by an arrow (c) in the drawing) that cultured cells are assumed to have, a more satisfactory measurement can be carried out by a cell culture chip 100 having electrodes with a coverage higher than or equal to 25%.

Figure 8:
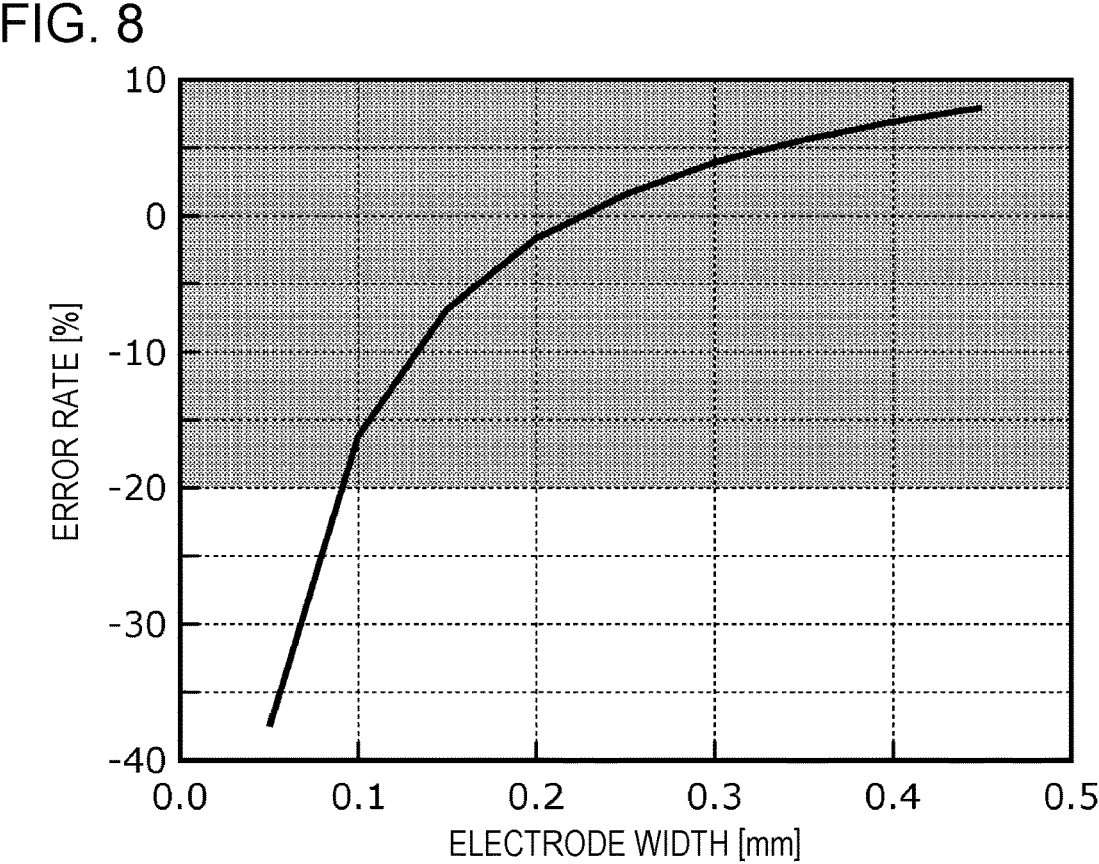
FIG. 8 is a second diagram showing results of simulations regarding electrode widths according to the embodiment.

Further, the following describes, on the basis of results of simulations with reference to FIG. 8, the definition of a direction across the direction of extension of the electrodes. FIG. 8 is a second diagram showing results of simulations regarding electrode widths according to the embodiment. FIG. 8 shows a change in error rate in simulated value with respect to a change in width (hereinafter also referred to as "electrode width") of the electrodes during a patterning process performed on an electrode coating formed on the principal surface of the first substrate 11 or the second substrate 15.

The term "electrode width" here means a size, included in sizes of an electrode in a direction across the direction of extension of the electrode, that is different from an electrode thickness, defined by the thickness of a film during formation, that is the size of the electrode in the direction of stacking. That is, the term "electrode width" refers to the size of an electrode in a direction orthogonal to the direction of extension and the direction of stacking. Note here that the value of electric resistance of cultured cells serving as a target of measurement is set at 100Ω.

As shown in FIG. 8, it is found that a greater electrode width leads to reduced electric resistance within the electrode and a lower error rate in simulated value, with the electrode thickness being constant. As shown in FIG. 8, it is found that an electrode width greater than or equal to 0.1 mm is only needed for an electric resistance of 100Ω) to be measured with the satisfaction of the standard of measurement. Further, in view of the results shown in FIG. 7A, in which higher electric resistance of cultured cells leads to a lower error rate, a cell culture chip 100 having electrodes with an electrode width of 0.1 mm is only needed to measure electric resistance higher than or equal to 100Ω).

Figure 9:
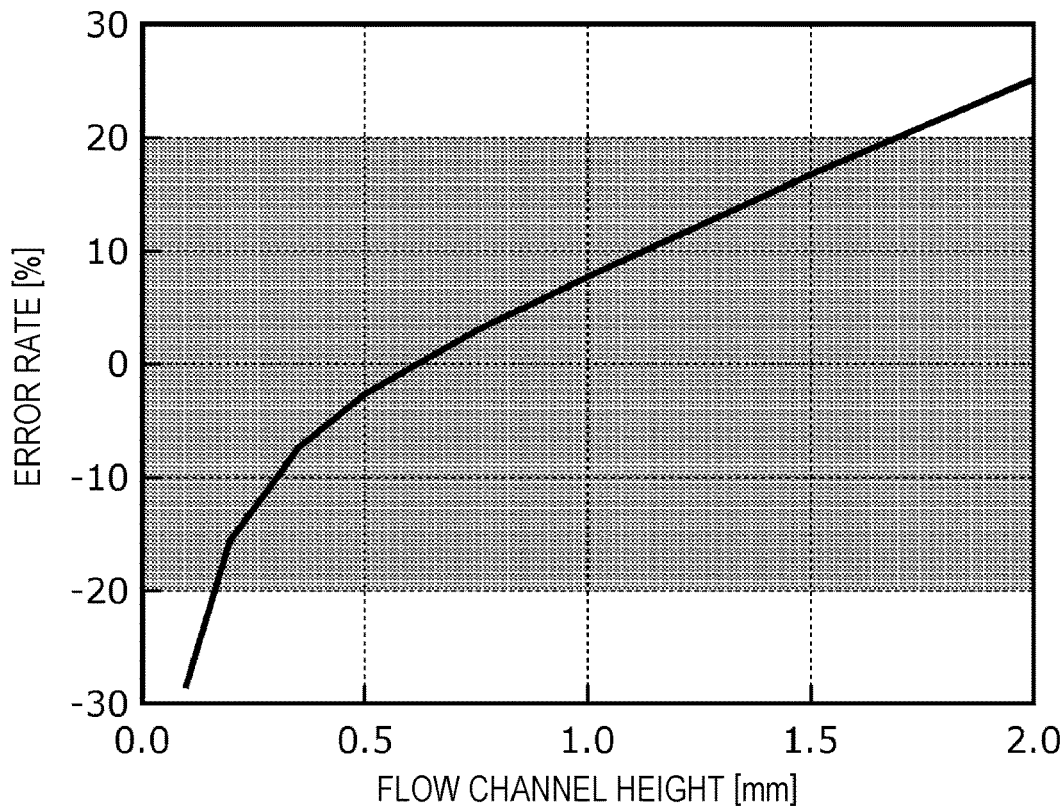
FIG. 9 is a second diagram showing results of simulations regarding flow channel heights according to the embodiment.

The following further describes, with reference to FIG. 9, a relationship between flow channel heights defining distances between the first and third electrodes 21 and 23 and the second and fourth electrodes 22 and 24 and error rates in simulated value. FIG. 9 is a second diagram showing results of simulations regarding flow channel heights according to the embodiment. FIG. 9 shows a graph representing a relationship between sizes of the first flow channel 33 and the second flow channel 41, particularly the first main flow channel 36 and the second main flow channel 44, which correspond to the electric field region, in the direction of stacking and error rates in simulated value. The simulations here are performed under conditions where of the sizes of the first main flow channel 36 and the second main flow channel 44, flow channel widths serving as sizes in a direction across the direction of extension and the direction of stacking are set at 10 mm, which falls within a designable range that tends to be most susceptible to errors.

The first and third electrodes 21 and 23 formed on the principal surface of the first substrate 11 and the second and fourth electrodes 22 and 24 formed on the principal surface of the second substrate 15 are placed at distances corresponding to the thicknesses of the first and second bulkhead layers 12 and 14. The thickness of the first bulkhead layer 12 agrees with the size of the first main flow channel 36 in the direction of stacking. Further, the thickness of the second bulkhead layer 14 agrees with the size of the second main flow channel 44 in the direction of stacking. The distances between the first and third electrodes 21 and 23 and the second and fourth electrodes 22 and 24 are an error factor related, for example, to the values of resistance of fluids that are passed through the flow channels.

As shown in FIG. 9, there is an appropriate range of flow channel heights that satisfies the standard of measurement. For example, in the example shown in FIG. 9, a range of flow channel heights greater than or equal to 0.2 mm and less than or equal to 1.5 mm needs to be set for an electric resistance of 100Ω) to be measured with the satisfaction of the standard of measurement. The electric field region, which spans the first flow channel 33 and the second flow channel 41, has a height (i.e. a size in the direction of stacking) greater than or equal to 0.2 mm and less than or equal to 1.5 mm. With a cell culture chip 100 having a flow channel height falling within the aforementioned range, the electric resistance of cultured cells, such as 100Ω), can be satisfactorily measured under such a standard of measurement that an error rate falls within a range of ±20%.

Other examples of the configuration of the electrodes according to the present embodiment are described here with reference to FIGS. 10A to 10D. FIGS. 10A to 10D, which are described below, illustrate only the cell culture region 50, the first electrode, and the third electrode in a plan view within the area A1 from the same point of view as FIG. 6.

Further, other examples of the configuration of the electrodes, which are described blow, may be applied to only either the first or third electrode, may be applied to both the first and third electrodes, or may be applied to all of the first, second, third, and fourth electrodes.

Figure 10A:
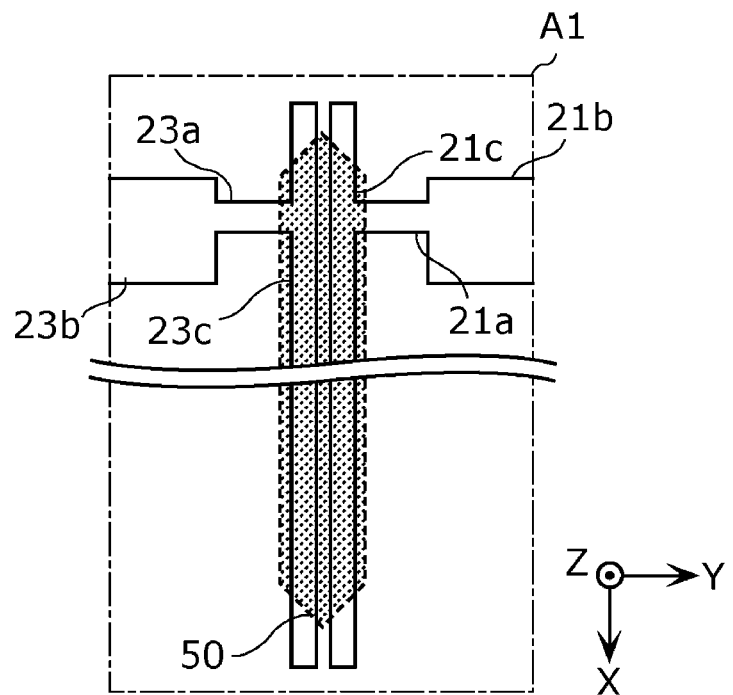
FIG. 10A is a first diagram explaining about a configuration of electrodes according to the embodiment.

FIG. 10A is a first diagram explaining about a configuration of electrodes according to the embodiment. As shown in FIG. 10A, a first electrode 21c and a third electrode 23c extend along the cell culture region 50 in a range longer than 100% of the length of the cell culture region 50. That is, the first electrode 21c and the third electrode 23c extend to outside the cell culture region 50 in a direction along the first main flow channel 36. The same may apply to the second electrode and the fourth electrode. This configuration, in which ends of the electrodes are not located within the cell culture region 50, makes it possible to reduce the influence on measured values by microturbulences generated at the ends of the electrodes.

Figure 10B:
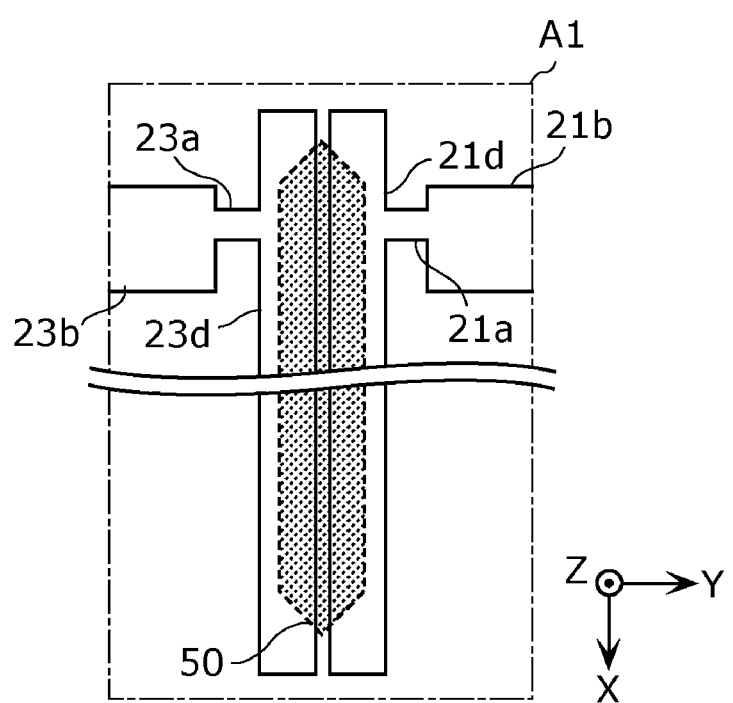
FIG. 10B is a second diagram explaining about a configuration of electrodes according to the embodiment.

Further, FIG. 10B is a second diagram explaining about a configuration of electrodes according to the embodiment. As shown in FIG. 10B, a first electrode 21d and a third electrode 23d extend along the cell culture region 50 in a range longer than 100% of the length of the cell culture region 50. Further, the first electrode 21d and the third electrode 23d are greater in width (i.e. length in the direction parallel with the Y axis) than the first electrode 21 and the third electrode 23 according to the embodiment described above. The same may apply to the second electrode and the fourth electrode. This configuration makes it possible to easily align the first and third electrodes 21d and 23d with the second and fourth electrodes in the direction parallel with the Y axis and align the first and third electrodes 21d and 23d with the cell culture region 50 (i.e. with the first flow channel 33 and the second flow channel 41).

Figure 10C:
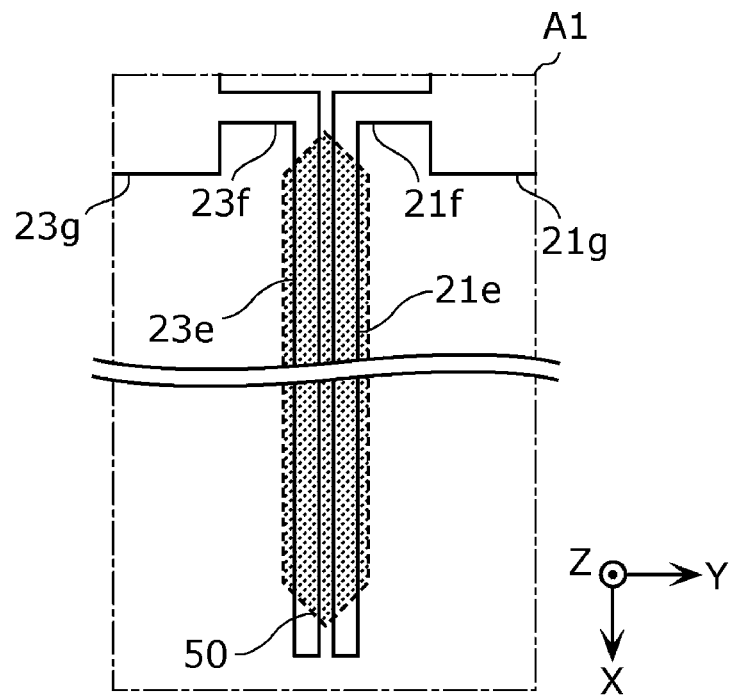
FIG. 10C is a third diagram explaining about a configuration of electrodes according to the embodiment.

Further, FIG. 10C is a third diagram explaining about a configuration of electrodes according to the embodiment. As shown in FIG. 10C, a first electrode 21e and a third electrode 23e extend along the cell culture region 50 in a range longer than 100% of the length of the cell culture region 50. Further, the first electrode 21e has one end extending to outside the cell culture region 50 to be electrically connected via a first lead 21f to a first contact point 21g outside the cell culture region 50. Similarly, the third electrode 23e has one end extending to outside the cell culture region 50 to be electrically connected via a third lead 23f to a third contact point 23g outside the cell culture region 50. The same may apply to the second electrode and the fourth electrode. This configuration, in which the leads connecting the electrodes to the terminals are not located within the cell culture region 50, makes it possible to reduce the influence on measured values by microturbulences generated in the leads.

Figure 10D:
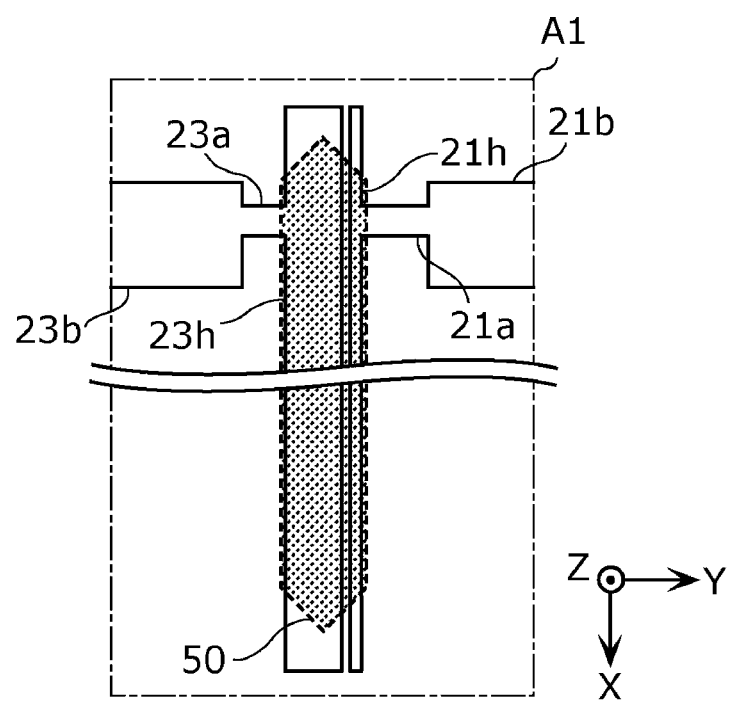
FIG. 10D is a fourth diagram explaining about a configuration of electrodes according to the embodiment.

Further, FIG. 10D is a fourth diagram explaining about a configuration of electrodes according to the embodiment. As shown in FIG. 10D, a third electrode 23h is greater (i.e. wider) in width (i.e. length in the direction parallel with the Y axis) than a first electrode 21h. Further, the same may apply to the second electrode and the fourth electrode. For example, in a case where a current-measuring electrode and a potential-measuring electrode are separate in the measurement of electric resistance, it is preferable that the current-measuring electrode be an electrode that is as low in internal resistance (i.e. large in cross-sectional area) as possible. Accordingly, such a configuration makes it possible to more accurately measure electric resistance by using the third electrode 23h as a current-measuring electrode and using the first electrode 21h as a potential-measuring electrode.

In the following, an example of the embodiment is described with reference to FIGS. 11A to 17B. The example to be described below describes results obtained by fabricating a cell culture chip 100 and culturing model cells on the cell culture chip 100.

Figure 11A:
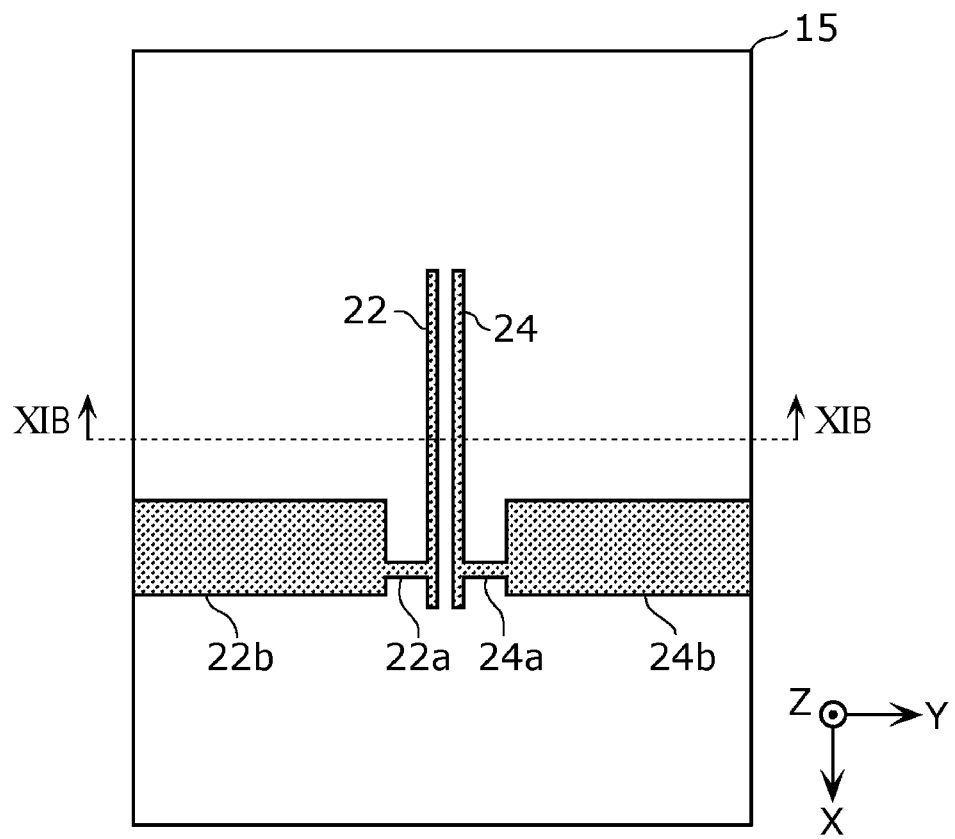
FIG. 11A is a plan view showing a first step in the fabrication of the cell culture chip.
Figure 11B:
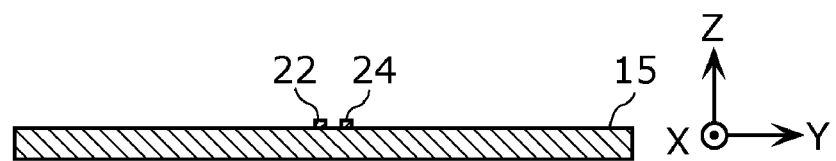
FIG. 11B is a cross-sectional view taken along line XIB-XIB in FIG. 11A.

FIG. 11A is a plan view showing a first step in the fabrication of a cell culture chip 100. Further, FIG. 11B is a cross-sectional view taken along line XIB-XIB in FIG. 11A. As shown in FIGS. 11A and 11B, in the first step in the fabrication of the cell culture chip 100, a second substrate 15 formed with glass was prepared. The second substrate 15 had a principal surface with an area of 1200 mm$^2$, 30 mm in the direction parallel with the Y axis by 40 mm in the direction parallel with the X axis, and a thickness (i.e. a length in the direction parallel with the Z axis) of 0.7 mm. Next, indium tin oxide (ITO) was formed by sputtering on this principal surface of the second substrate 15 so as to have a thickness of 150 nm, and the second electrode 22, the second lead 22a, the second contact point 22b, the fourth electrode 24, the fourth lead 24a, and the fourth contact point 24b were formed by etching. At this point in time, the second electrode 22 and the fourth electrode 24 were designed to be 0.1 mm wide and 10 mm long.

Figure 12A:
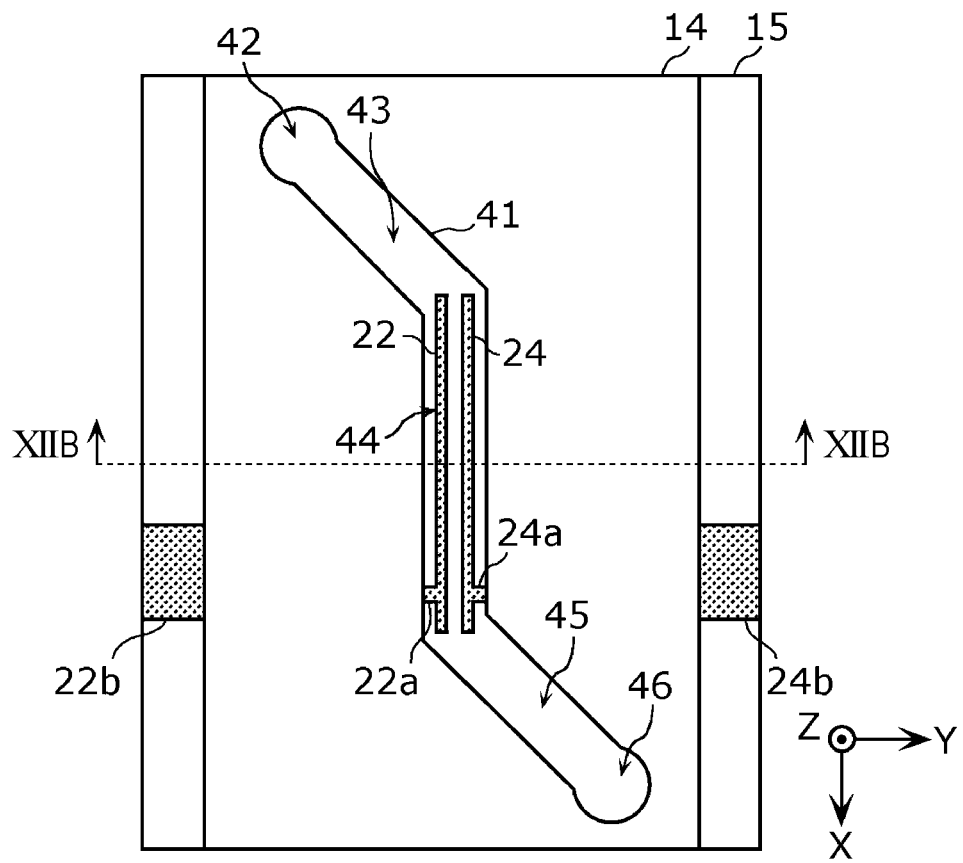
FIG. 12A is a plan view showing a second step in the fabrication of the cell culture chip.
Figure 12B:
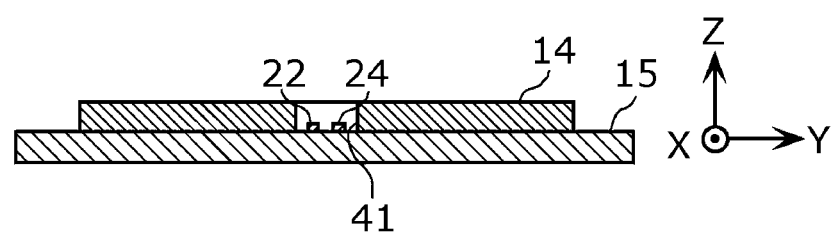
FIG. 12B is a cross-sectional view taken along line XIIB-XIIB in FIG. 12A.

FIG. 12A is a plan view showing a second step in the fabrication of the cell culture chip 100. Further, FIG. 12B is a cross-sectional view taken along line XIIB-XIIB in FIG. 12A. As shown in FIGS. 12A and 12B, in the second step in the fabrication of the cell culture chip 100, a second bulkhead layer 14 formed with silicone resin was bonded to the principal surface of the second substrate 15 on which the second electrode 22 and the fourth electrode 24 had been formed. The second bulkhead layer 14 had a principal surface with an area of 800 mm$^2$, 20 mm in the direction parallel with the Y axis by 40 mm in the direction parallel with the X axis, and a thickness (i.e. a length in the direction parallel with the Z axis) of 1.0 mm. The second bulkhead layer 14 had a second through-hole formed in advance therein. Specifically, the second through-hole was formed by laser cutting so as to have a width of 1.0 mm.

In the formation of the second through-hole, a linear part having a length of 13 mm and corresponding to the second main flow channel 44 was formed along the direction parallel with the X axis. Further, in the formation of the second through-hole, a first-end-side inclined part extending in a direction at an inclination of 30 degrees from an X-axis negative-side end of the linear part toward a negative side of the X axis and a negative side of the Y axis with respect to the direction parallel with the X axis and corresponding to the second inflow channel 43 was formed. Further, in the formation of the second through-hole, a part corresponding to the second inlet 42 was formed on the extension of the first-end-side inclined part and in a place that does not reach an end of the second bulkhead layer 14.

Further, in the formation of the second through-hole, a second-end-side inclined part extending in a direction at an inclination of 30 degrees from an X-axis positive-side end of the linear part toward a positive side of the X axis and a positive side of the Y axis with respect to the direction parallel with the X axis and corresponding to the second outflow channel 45 was formed. Further, in the formation of the second through-hole, a part corresponding to the second outlet 46 was formed on the extension of the second-end-side inclined part and in a place that does not reach an end of the second bulkhead layer 14. The second and fourth contact points 22b and 24b formed on the second substrate 15 were exposed by making the second bulkhead layer 14 and the second substrate 15 20 mm and 30 mm long in the direction parallel with the Y axis, respectively. That is, the second bulkhead layer 14 was bonded so that at least parts of ends of the second substrate 15 in the direction parallel with the Y axis were exposed.

The second bulkhead layer 14 was bonded with alignment performed so that the linear part of the second through-hole was in a position corresponding to the second electrode 22 and the fourth electrode 24. The bonding of the second bulkhead layer 14 was performed by applying a silicone resin material to the principal surface of the second substrate 15 in a molten state, bonding the second bulkhead layer 14 to the principal surface of the second substrate 15, and then leaving the semi-finished chip standing for two hours in an atmosphere at 65° C. The silicone resin material was the same as that by which the second bulkhead layer 14 was formed.

Figure 13A:
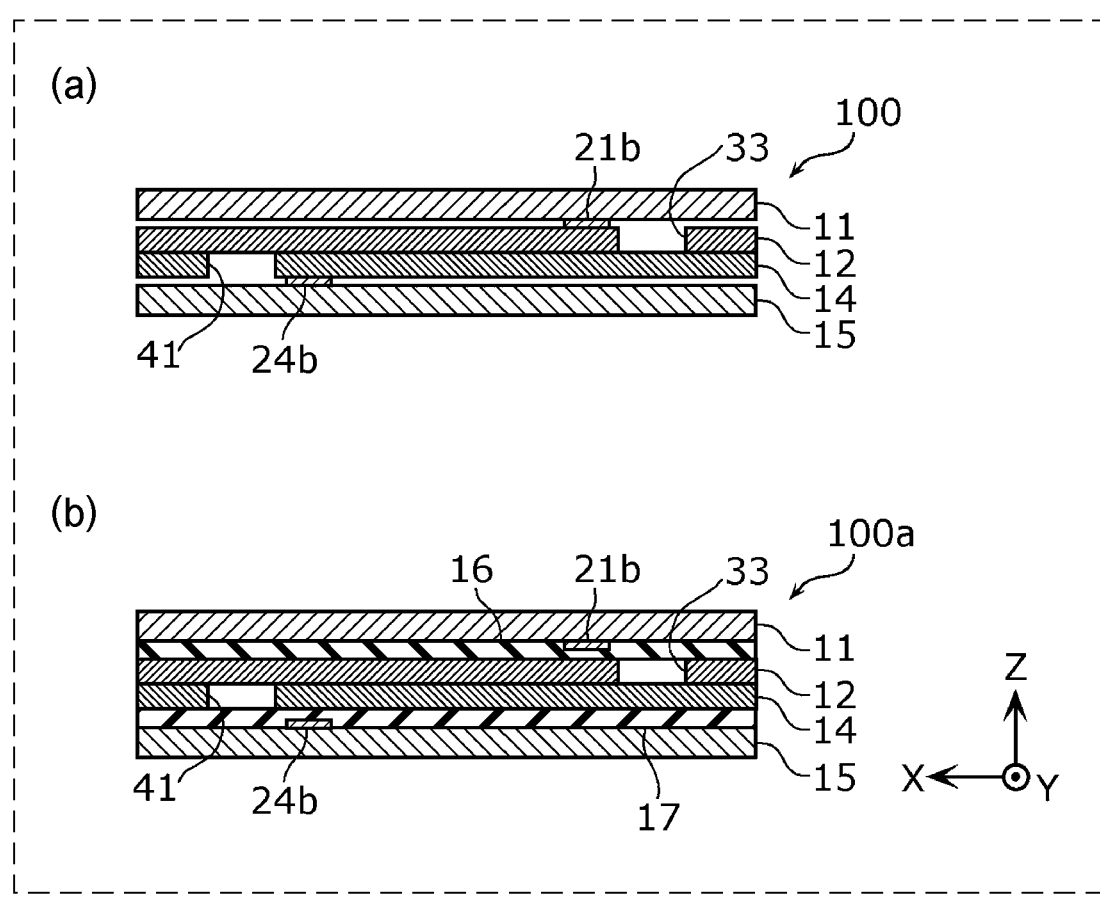
FIG. 13A is a cross-sectional view explaining about a first insulating film and a second insulating film according to the embodiment.
Figure 13B:
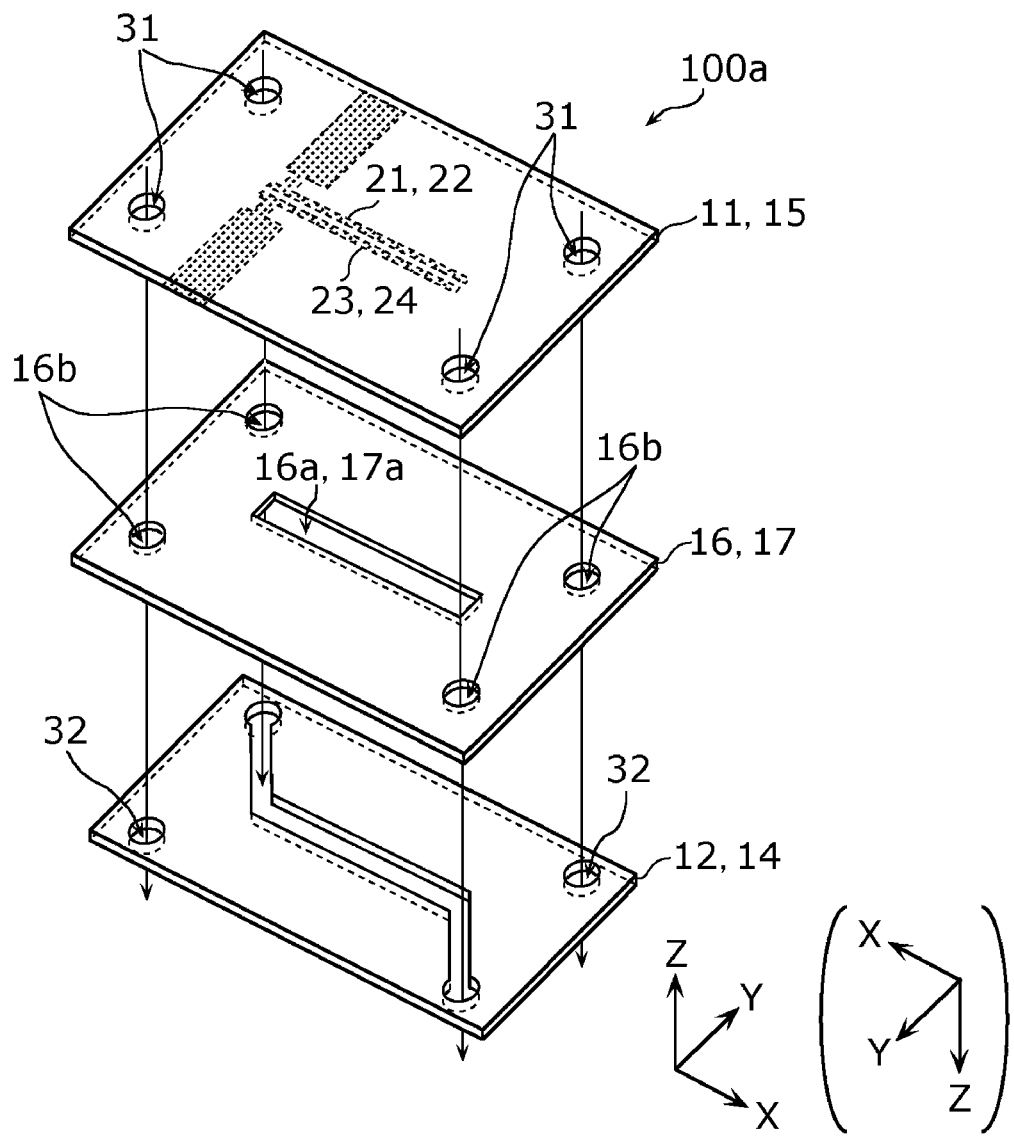
FIG. 13B is an exploded perspective view explaining about the first insulating film and the second insulating film according to the embodiment.

The bonding together of the second substrate 15 and the bulkhead layer 14 is described in more detail with reference to FIGS. 13A and 13B. FIG. 13A is a cross-sectional view explaining about a first insulating film 16 and a second insulating film 17 according to the embodiment. Further, FIG. 13B is an exploded perspective view explaining about the first insulating film 16 and the second insulating film 17 according to the embodiment. (a) of FIG. 13A is a cross-sectional view taken along line XIIIA-XIIIA in FIG. 5A, and (b) of FIG. 13A illustrates the first substrate 11, the first bulkhead layer 12, the first insulating film 16, which is disposed between the first substrate 11 and the first bulkhead layer 12, the second substrate 15, the second bulkhead layer 14, and the second insulating film 17, which is disposed between the second substrate 15 and the second bulkhead layer 14.

Further, FIG. 13B illustrates the first substrate 11, the first bulkhead layer 12, and the first insulating film 16, which is disposed between the first substrate 11 and the first bulkhead layer 12 and, when seen upside down, can also be deemed to illustrate the second substrate 15, the second bulkhead layer 14, and the second insulating film 17, which is disposed between the second substrate 15 and the second bulkhead layer 14. It should be noted that signs in parentheses and directional axes in parentheses apply only when FIG. 13B is upside down. Further, when FIG. 13B is upside down, the holes 31 and the holes 32 are ignored, as they are not present in the second substrate 15 or the second bulkhead layer 14. Similarly, holes 16b are ignored, as they are present in the first insulating film 16 but not present in the second insulating film 17. The following description describes a configuration on the sides of the first substrate 11 and the first bulkhead layer 12. Since a similar description can be given, for example, by reading the term "first substrate 11" as "second substrate 15" and reading the term "first bulkhead layer 12" as "second bulkhead layer 14", a description of a configuration on the sides of the second substrate 15 and the second bulkhead layer 14 is omitted.

As shown in FIG. 13A, the embodiment described above assumes that the first substrate 11 and the first bulkhead layer 12 are bonded together via the first electrode 21, the first lead 21a, the first contact point 21b, the second electrode 22, the second lead 22a, and the second contact point 22b. In this case, it is not necessary to take the thickness of the first electrode 21 or other members into account, provided either the first substrate 11 and the first bulkhead layer 12 or an adhesive layer formed by an adhesive for bonding them together is made of a pliant material.

However, under certain conditions, such as a case where the first substrate 11 and the first bulkhead layer 12 are made of hard materials and the adhesive forms a very thin adhesive layer, a gap is formed between the first substrate 11 and the first bulkhead layer 12 by the thickness of the first electrode 21 or other members. In this case, passing a fluid through the first flow channel 33 causes the fluid to leak out from the gap, and may make an accurate measurement impossible. In such a case, a cell culture chip 100a having a sheet-shaped first insulating film 16 disposed between the first substrate 11 and the first bulkhead layer 12 can be used.

The first insulating film 16 is formed with a material having a uniform thickness and pliability, e.g. by acrylic resin or other materials. The uniform thickness and the pliability allow the first insulating film 16 to absorb the thickness of the first electrode 21 or other members and fill the gap formed between the first substrate 11 and the first bulkhead layer 12. The first electrode 21, which is formed on the principal surface of the first substrate 11, needs to be exposed to the first through-hole of the first bulkhead layer 12.

That is, it is desirable that no other members be present between a part of the principal surface of the first substrate 11 on which the first electrode 21 is present and the first bulkhead layer 12. Accordingly, in a part of the first insulating film 16 corresponding to the first electrode 21, a first opening 16a (in the case of the second insulating film 17, a second opening 17a) penetrating the first insulating film 16 in the thickness direction is formed. Further, similarly, it is desirable that no other members be present between the holes 31 and the holes 32. Accordingly, in parts of the first insulating film 16 corresponding to the holes 31 and the holes 32, holes 16b penetrating the first insulating film 16 in the thickness direction are formed.

Thus, in the cell culture chip 100a, the first insulating film 16 for filling the gap formed between the first substrate 11 and the first bulkhead layer 12 may be provided without impairing the functions of, for example, culturing cells and measuring electric resistance.

Figure 14A:
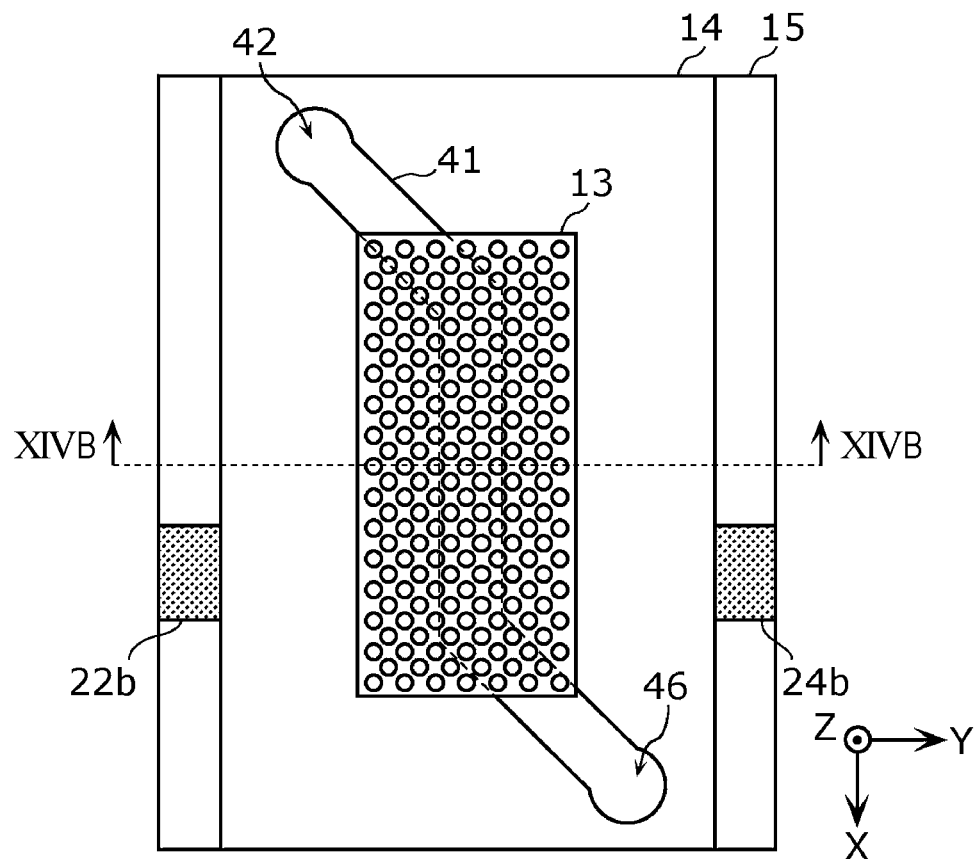
FIG. 14A is a plan view showing a third step in the fabrication of the cell culture chip.
Figure 14B:
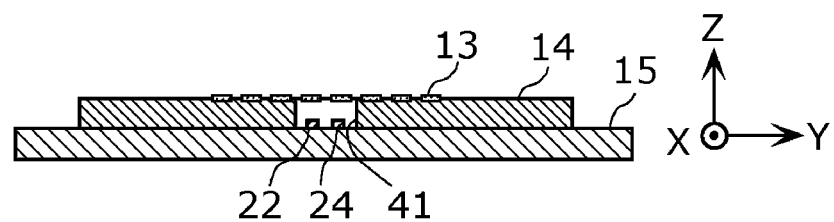
FIG. 14B is a cross-sectional view taken along line XIVB-XIVB in FIG. 14A.

FIG. 14A is a plan view showing a third step in the fabrication of the cell culture chip 100. Further, FIG. 14B is a cross-sectional view taken along line XIVB-XIVB in FIG. 14A. As shown in FIGS. 14A and 14B, in the third step in the fabrication of the cell culture chip 100, a cell separation membrane 13 formed with porous resin was bonded to the principal surface of the second bulkhead layer 14 so that the second principal surface 13b faced the principal surface of the second bulkhead layer 14.

The cell separation membrane 13 had a principal surface with an area of 70 mm$^2$, 5.0 mm in the direction parallel with the Y axis by 70 mm in the direction parallel with the X axis, and a thickness (i.e. a length in the direction parallel with the Z axis) of 10 μm. In the cell separation membrane 13, a through-hole having a pore diameter of 3.0 μm as the predetermined pore diameter had been formed. The cell separation membrane 13 was bonded so as to cover at least the linear part of the second through-hole, desirably with alignment performed so that the center of the cell separation membrane 13 in the X-Y plane substantially agrees with the center of the second bulkhead layer 14 in the X-Y plane. As in the case of the bonding together of the second substrate 15 and the second bulkhead layer 14, the bonding of the cell separation membrane 13 was performed by applying a silicone resin material to the principal surface of the second bulkhead layer 14 in a molten state, bonding the cell separation membrane 13 to the principal surface of the second bulkhead layer 14, and then leaving the semi-finished chip standing for two hours in an atmosphere at 65° C. The silicone resin material was the same as that by which the second bulkhead layer 14 was formed.

Figure 15A:
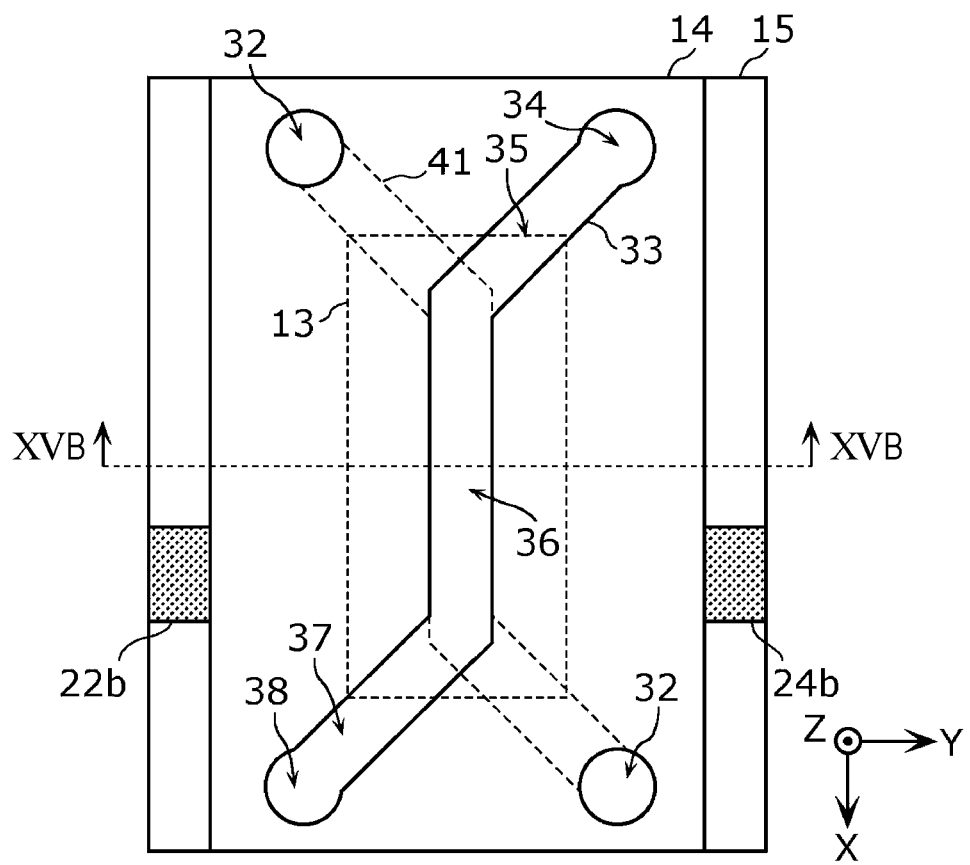
FIG. 15A is a plan view showing a fourth step in the fabrication of the cell culture chip.
Figure 15B:
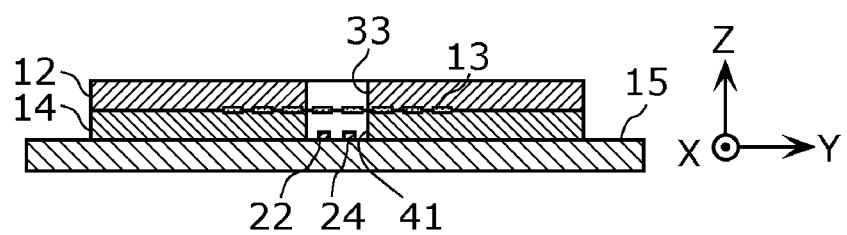
FIG. 15B is a cross-sectional view taken along line XVB-XVB in FIG. 15A.

FIG. 15A is a plan view showing a fourth step in the fabrication of the cell culture chip 100. Further, FIG. 15B is a cross-sectional view taken along line XVB-XVB in FIG. 15A. As shown in FIGS. 15A and 15B, in the fourth step in the fabrication of the cell culture chip 100, a first bulkhead layer 12 formed with silicone resin was bonded to the principal surfaces of the cell separation membrane 13 and the second bulkhead layer 14.

The first bulkhead layer 12 was equivalent to the second bulkhead layer 14 and had a principal surface with an area of 800 mm$^2$, 20 mm in the direction parallel with the Y axis by 40 mm in the direction parallel with the X axis, and a thickness (i.e. a length in the direction parallel with the Z axis) of 1.0 mm. The first bulkhead layer 12 had a first through-hole and holes 32 formed in advance therein. Specifically, the first through-hole was formed by laser cutting so as to have a width of 1.0 mm, and the holes 32 were each formed by laser cutting so as to have a diameter of 0.5 mm.

In the formation of the first through-hole, a linear part having a length of 13 mm and corresponding to the first main flow channel 36 was formed along the direction parallel with the X axis. Further, in the formation of the first through-hole, a first-end-side inclined part extending in a direction at an inclination of 30 degrees from an X-axis negative-side end of the linear part toward a negative side of the X axis and a positive side of the Y axis with respect to the direction parallel with the X axis and corresponding to the first inflow channel 35 was formed. Further, in the formation of the first through-hole, a part corresponding to the first inlet 34 was formed on the extension of the first-end-side inclined part and in a place that does not reach an end of the first bulkhead layer 12.

Further, in the formation of the first through-hole, a second-end-side inclined part extending in a direction at an inclination of 30 degrees from an X-axis positive-side end of the linear part toward a positive side of the X axis and a negative side of the Y axis with respect to the direction parallel with the X axis and corresponding to the first outflow channel 37 was formed. Further, in the formation of the first through-hole, a part corresponding to the first outlet 38 was formed on the extension of the second-end-side inclined part and in a place that does not reach an end of the first bulkhead layer 12.

As in the case of the bonding together of the second substrate 15 and the second bulkhead layer 14, the bonding of the first bulkhead layer 12 was performed by applying a silicone resin material to the principal surfaces of the cell separation membrane 13 and the second bulkhead layer 14 in a molten state, bonding the first bulkhead layer 12 to the principal surfaces of the cell separation membrane 13 and the second bulkhead layer 14, and then leaving the semi-finished chip standing for two hours in an atmosphere at 65° C. The silicone resin material was the same as that by which the first bulkhead layer 12 was formed.

Figure 16A:
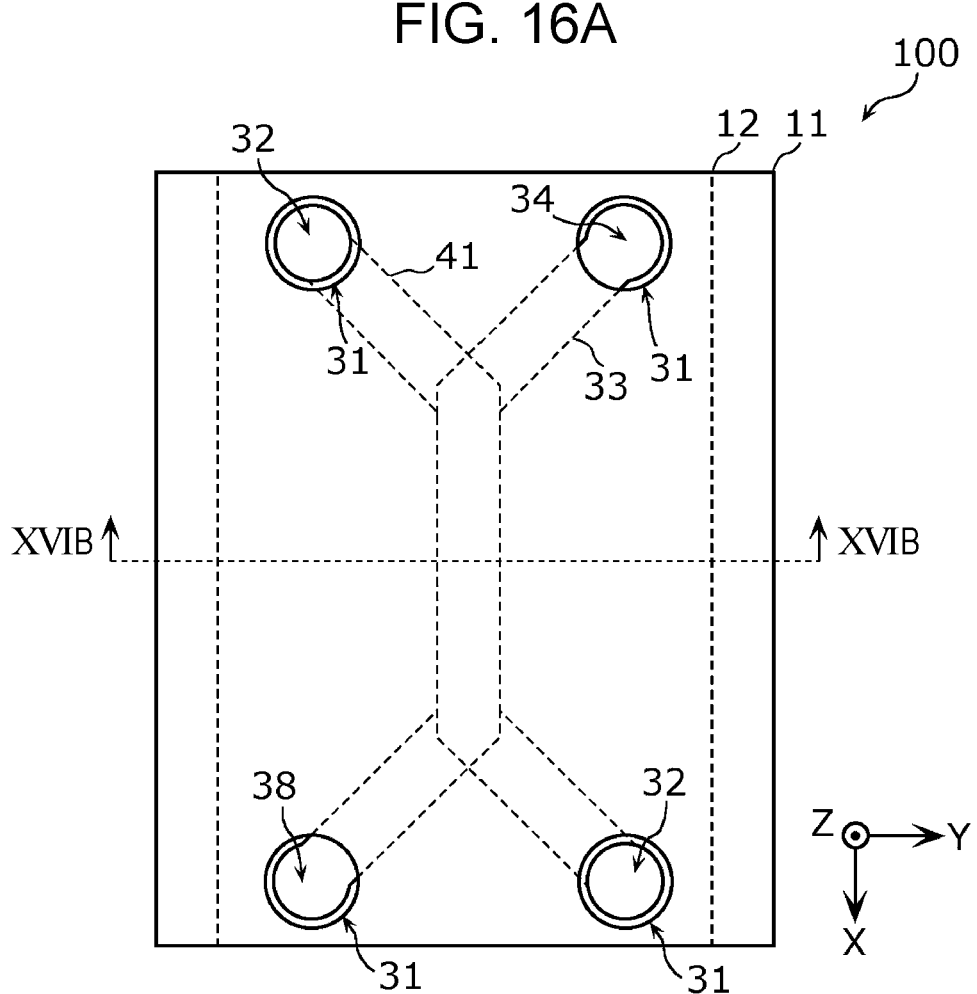
FIG. 16A is a plan view showing a fifth step in the fabrication of the cell culture chip.
Figure 16B:
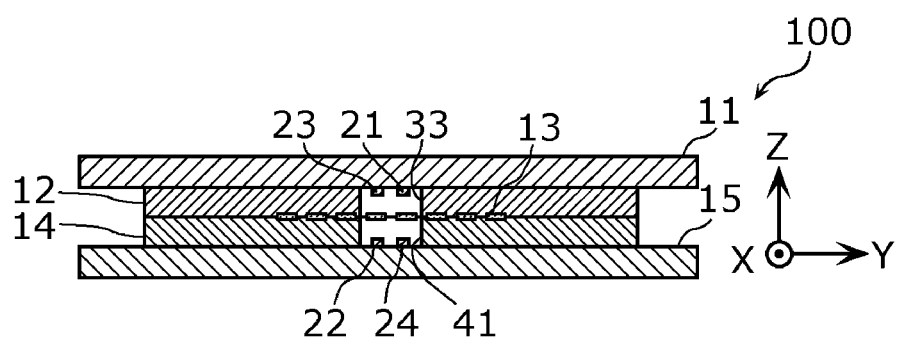
FIG. 16B is a cross-sectional view taken along line XVIB-XVIB in FIG. 16A.

FIG. 16A is a plan view showing a fifth step in the fabrication of the cell culture chip 100. Further, FIG. 16B is a cross-sectional view taken along line XVIB-XVIB in FIG. 16A. As shown in FIGS. 16A and 16B, in the fifth step in the fabrication of the cell culture chip 100, a first substrate 11 formed with glass was prepared. The first substrate 11 had a principal surface with an area of 1200 mm$^2$, 30 mm in the direction parallel with the Y axis by 40 mm in the direction parallel with the X axis, and a thickness (i.e. a length in the direction parallel with the Z axis) of 0.7 mm. Next, indium tin oxide (ITO) was formed by sputtering on this principal surface of the first substrate 11 so as to have a thickness of 150 nm, and the first electrode 21, the first lead 21a, the first contact point 21b, the third electrode 23, the third lead 23a, and the third contact point 23b were formed by etching. At this point in time, the first electrode 21 and the third electrode 23 were designed to be 0.1 mm wide and 10 mm long.

In this way, the first substrate 11 was bonded to the first bulkhead layer 12 so that the principal surface of the first substrate 11 on which the first electrode 21, the first lead 21a, the first contact point 21b, the third electrode 23, the third lead 23a, and the third contact point 23b had been formed faced the first bulkhead layer 12. The first and third contact points 21b and 23b formed on the first substrate 11 were exposed by making the first bulkhead layer 12 and the first substrate 11 20 mm and 30 mm long in the direction parallel with the Y axis, respectively. That is, the first substrate 11 was bonded so that at least parts of ends of the first substrate 11 in the direction parallel with the Y axis were exposed.

The first substrate 11 was bonded with alignment performed so that the linear part of the first through-hole was in a position corresponding to the first electrode 21 and the third electrode 23. The bonding of the first substrate 11 was performed by applying a silicone resin material to the principal surface of the first bulkhead layer 12 in a molten state, bonding the first substrate 11 to the principal surface of the first bulkhead layer 12, and then leaving the semi-finished chip standing for two hours in an atmosphere at 65° C. The silicone resin material was the same as that by which the first bulkhead layer 12 was formed.

In a case where bonding is done by applying the silicone resin material in a molten state and leaving the semi-finished chip standing for two hours in an atmosphere at 65° C., the steps of leaving the semi-finished chip standing for two hours in an atmosphere at 65° C. may be executed at once. In this way, a cell culture chip 100 identical to the embodiment was fabricated.

Figure 17A:
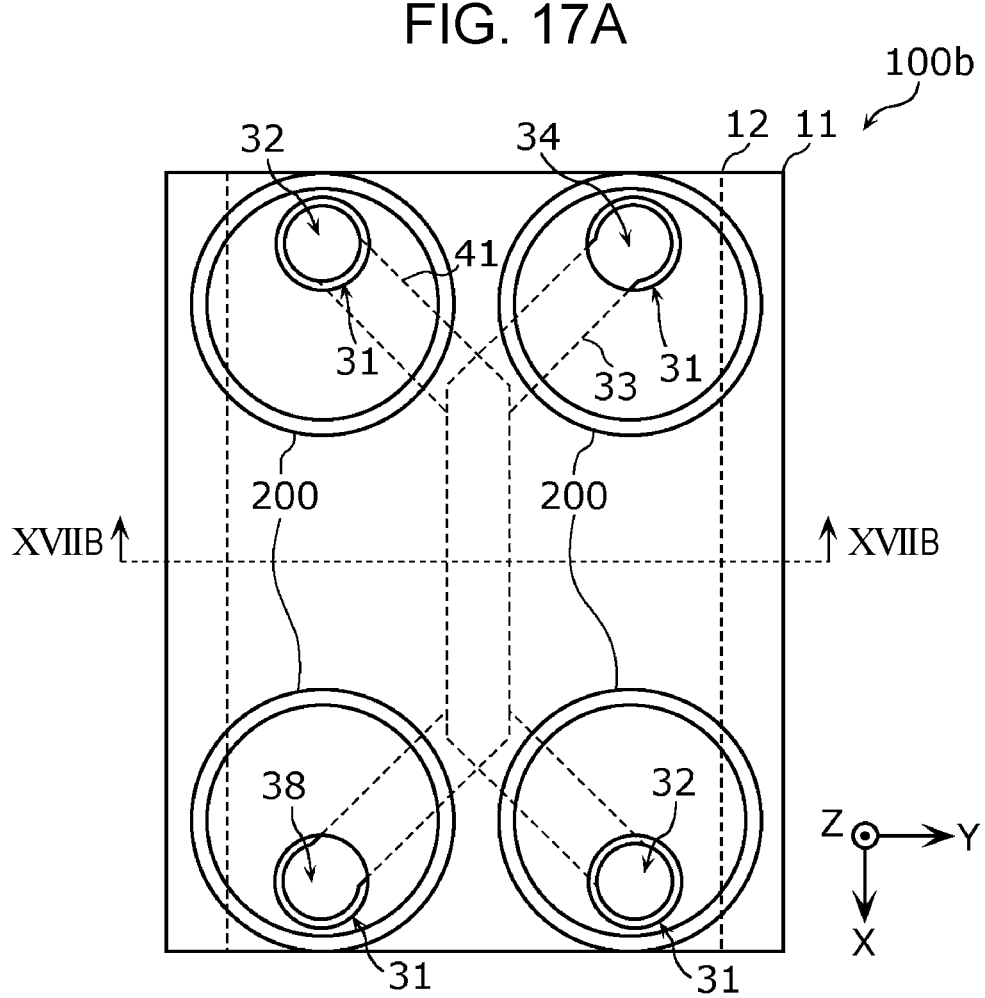
FIG. 17A is a plan view showing a sixth step in the fabrication of a cell culture chip.
Figure 17B:
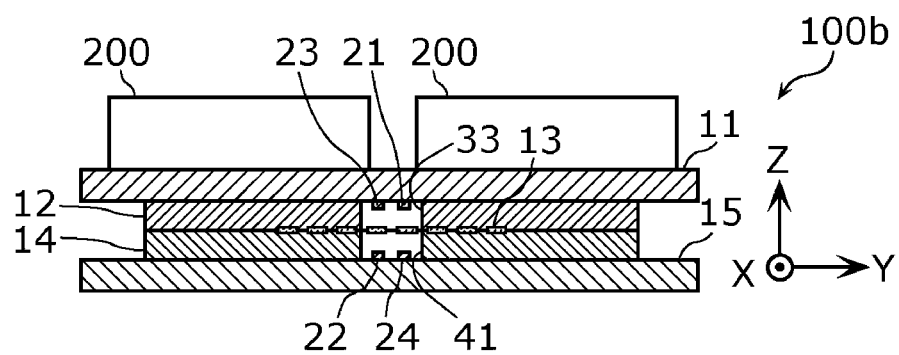
FIG. 17B is a cross-sectional view taken along line XVIIB-XVIIB in FIG. 17A.

Further, in the present example, storage tanks for culture media for use in the culture of cells were further attached. FIG. 17A is a plan view showing a sixth step in the fabrication of a cell culture chip. Further, FIG. 17B is a cross-sectional view taken along line XVIIB-XVIIB in FIG. 17A. As shown in FIGS. 17A and 17B, in the sixth step in the fabrication of a cell culture chip, a cell culture chip 100b was fabricated by bonding storage tanks 200 to the cell culture chip 100 fabricated by the fifth step. Each of the storage tanks 200 is a cylindrical member, formed with silicone resin, that has a diameter of 6.0 mm and a height (i.e. a length in the direction parallel with the Z axis) of 7.0 mm and, by being bonded onto the first substrate 11, becomes a container having a bottom surface formed by the principal surface of the first substrate 11. The storage tanks 200 were bonded separately to each of the holes 31 provided in the first substrate 11. Due to the aforementioned dimensions, each of the storage tanks 200 has a capacity of approximately 200 μL. The storage tanks 200 were bonded in the same manner as that described above, i.e. by applying a silicone resin material to the principal surface of the first substrate 11 in a molten state and leaving the semi-finished chip standing for two hours in an atmosphere at 65° C.

Next, the cell culture chip 100b fabricated by the sixth step was used to culture the model cells, Caco-2 cells, which belong to a strain of cells derived from human colon cancer. First, the cell culture chip 100b was subjected to thirty minutes of ultraviolet irradiation, subjected to sterilization, and washed three times with phosphate buffered saline (PBS). Then, 10 μL of a culture medium were injected into the second flow channel 41, and 10 μL of a cell suspension were injected into the first flow channel 33. The cell suspension used was a suspension prepared in advance so that the number of Caco-2 cells was $2.0 \times 10^6$ (cells/μL). This cell culture chip 100b was left standing for stationary culture for thirty minutes in a 5% $CO_2$ atmosphere at 37° C. Furthermore, 150 μL of a culture medium were injected into each of the storage tanks 200 of the cell culture chip 100b, and a measurement of electric resistance was carried out once a day while stationary culture was being conducted in a 5% $CO_2$ atmosphere at 37° C. An operation of removing the culture medium from all of the storage tanks 200 and injecting 150 of a fresh culture medium into each of the storage tanks 200 was performed twice a day.

In the measurement of electric resistance, the measuring instrument 300, the control device 301, and the switch box 302 of the cell culture apparatus 500 described above were used. The first electrode 21 was connected via the first contact point 21b to the connection terminal S1, and the third electrode 23 was connected via the third contact point 23b to the third connection terminal S3. Further, the second electrode 22 was connected via the second contact point 22b to the connection terminal S2, and the fourth electrode 24 was connected via the fourth contact point 24b to the connection terminal S4.

$R_{12}$, $R_{13}$, $R_{24}$, and $R_{34}$ were measured in accordance with control signals sent from the control device 301. Further, the electric resistance of a cell sheet of the Caco-2 cells thus cultured was calculated according to the foregoing Formula (1). From the electric resistance thus calculated of the cell sheet, a transient rise in resistance value was observed, and the process of formation and disintegration of intercellular matrices such as tight junctions was estimated. Since such an estimation was not found in visual estimations of cell states, it was confirmed that an estimation of a cell state in the present disclosure is higher in accuracy than a conventional visual estimation of a cell state.

Other Embodiments

While the foregoing has described embodiments or other examples, the present disclosure is not limited to the foregoing embodiments or other examples.

Further, while the foregoing embodiments or other examples have illustrated constituent elements that constitute a cell culture apparatus, the functions of the constituent elements of the cell culture apparatus may be allocated in any way to a plurality of portions that constitute the cell culture apparatus.

The present disclosure also encompasses other embodiments such as embodiments obtained by applying, to the embodiments or other examples, various modifications conceived of by persons skilled in the art or embodiments achieved by arbitrarily combining constituent elements and functions of the embodiments or other examples without departing from the scope of the present disclosure.

For example, while, in the foregoing embodiment, the cell culture chip has been described as having a laminated structure, the cell culture chip may be integrally formed by using a technology such as a 3D printer.

Further, for example, the first substrate and the first and second electrodes do not need to be transparent. In a case where it is only necessary to measure the electric resistance of a cell sheet, it is not necessary to be able to visually check the cell state of cells.

Further, a single cell culture chip may comprise a plurality of configurations similar to the configuration of the foregoing embodiment (which comprise a first flow channel, a second flow channel, a first electrode, and a second electrode) and be configured such that cells can be cultured at once under a plurality of conditions or tests in cultured cells can be carried out.

Further, while, in the foregoing embodiment, the cell culture region has a linear shape formed by the first and second main flow channels overlapping while extending in a linear fashion, the cell culture region may have a curved shape formed by the first and second main flow channels extending in a curved line, provided the first flow channel and the second flow channel overlap.

Further, for example, the present disclosure may be achieved by a two-terminal system that does not comprise the third electrode or the fourth electrode and includes only the first electrode and the second electrode. Further, in this case, it is not necessary to comprise the switch box or the control device. The present disclosure can be achieved as cell culture apparatus comprising at least one selected from the group consisting of the cell culture chip and the measuring instrument.

The present disclosure contributes to a new evolution, for example, in the construction of a cell culture apparatus and a test system based on cells cultured with the cell culture apparatus and in the development of drugs.

What is claimed is:

1. A cell culture chip comprising:
a body comprising a first flow channel and a second flow channel; and
a cell separation membrane, wherein:
the first and second flow channels are independent from each other, the body is formed with an overlapping flow channel portion, the overlapping flow channel portion being a part where at least a portion of the first flow channel and at least a portion of the second flow channel overlap each other as viewed in a normal direction of the cell separation membrane,
the cell separation membrane has first and second principal surfaces facing away from each other, the cell separation membrane being disposed between the first flow channel and the second flow channel so that the first flow channel is located on the first principal surface and the second flow channel is located on the second principal surface,
the cell culture chip further comprises:
a first electrode which is in contact with the at least the portion of the first flow channel, and provided in the at least the portion of the first flow channel along a direction in which a liquid flows through the overlapping flow channel portion;
a second electrode which is in contact with the at least the portion of the second flow channel, and provided in the at least the portion of the second flow channel along the direction in which the liquid flows through the overlapping flow channel portion;
a third electrode which is in contact with the at least the portion of the first flow channel, and provided in the at least the portion of the first flow channel along the direction in which the liquid flows through the overlapping flow channel portion while being at a distance from the first electrode; and
a fourth electrode which is in contact with the at least the portion of the second flow channel, and provided in the at least the portion of the second flow channel along the direction in which the liquid flows through the overlapping flow channel portion while being at a distance from the second electrode, and when seen in the normal direction of the cell separation membrane, the first electrode and the fourth electrode are disposed to overlap with each other and the second electrode and the third electrode are disposed to overlap with each other.

2. The cell culture chip according to claim 1, wherein the first flow channel and the second flow channel include an electric field region that is a region spanning the first flow channel and the second flow channel in a place where the first flow channel and the second flow channel extend over each other when seen from an angle parallel with the normal direction, the electric field region being a region where the first electrode and the second electrode extend in the region, and a length of each of the first and second electrodes in a direction of extension is greater than or equal to 25% of a length of the electric field region in a direction of extension.

3. The cell culture chip according to claim 2, wherein the length of each of the first and second electrodes in the direction of extension is greater than or equal to 70% of the length of the electric field region in the direction of extension.

4. The cell culture chip according to claim 3, wherein the length of each of the first and second electrodes in the direction of extension is greater than or equal to 75% of the length of the electric field region in the direction of extension.

5. The cell culture chip according to claim 2, wherein in the electric field region, a total of lengths of the first flow channel and the second flow channel in the normal direction is greater than or equal to 0.2 mm and less than or equal to 1.5 mm.

6. The cell culture chip according to claim 1, wherein the first electrode and the second electrode each have a width of 0.1 mm in a direction across a direction of extension of the first electrode and the second electrode.

7. The cell culture chip according to claim 1, wherein
the body comprises a laminated structure in which a first substrate having a principal surface on which the first electrode has been formed, a first bulkhead layer, a second bulkhead layer, and a second substrate having a principal surface on which the second electrode has been formed have been stacked along the normal direction, wherein the laminated structure has been stacked in the order of the first substrate, the first bulkhead layer, the second bulkhead layer, and the second substrate,
the cell separation membrane is sandwiched between the first bulkhead layer and the second bulkhead layer,
the first bulkhead layer comprises a first through-hole penetrating the first bulkhead layer in a thickness direction in correspondence with the first electrode formed on the first substrate,
the second bulkhead layer comprises a second through-hole penetrating the second bulkhead layer in a thickness direction in correspondence with the second electrode formed on the second substrate,
the first flow channel comprises a first main flow channel demarcated by the principal surface on which the first electrode has been formed, the first through-hole, and the first principal surface,
the second flow channel comprises a second main flow channel demarcated by the principal surface on which the second electrode has been formed, the second through-hole, and the second principal surface, and the first main flow channel and the second main flow channel overlap when seen from an angle parallel with the normal direction.

8. The cell culture chip according to claim 7, further comprising:
a first insulating film having a shape of a sheet disposed between the first substrate and the first bulkhead layer and comprising a first opening penetrating the first insulating film in a thickness direction in correspondence with the first electrode; and
a second insulating film having a shape of a sheet disposed between the second substrate and the second bulkhead layer and comprising a second opening penetrating the second insulating film in a thickness direction in correspondence with the second electrode.

9. The cell culture chip according to claim 7, wherein
the first flow channel comprises the first main flow channel, a first inflow channel, and a first outflow channel, the first inflow channel and the first outflow channel leading to the first main flow channel,
the second flow channel comprises the second main flow channel, a second inflow channel, and a second outflow channel, the second inflow channel and the second outflow channel leading to the second main flow channel,
when seen from the angle parallel with the normal direction, the first inflow channel and the second inflow channel do not overlap and the first outflow channel and the second outflow channel do not overlap.

10. The cell culture chip according to claim 7, wherein a region where the first main flow channel and the second main flow channel overlap when seen from the angle parallel with the normal direction is a cell culture region, and the first electrode extends to outside the cell culture region in a direction along the first main flow channel and the second electrode extends to outside the cell culture region in a direction along the second main flow channel.

11. The cell culture chip according to claim 10, further comprising:
a first lead that, on the first substrate, electrically connects a first contact point provided on the first substrate with one end of the first electrode extended to outside the cell culture region; and
a second lead that, on the second substrate, electrically connects a second contact point provided on the second substrate with one end of the second electrode extended to outside the cell culture region.

12. The cell culture chip according to claim 7, wherein the first substrate and the first electrode are transparent.

13. The cell culture chip according to claim 7, wherein the second substrate and the second electrode are transparent.

14. The cell culture chip according to claim 1, wherein
the first electrode and the third electrode each have a shape of a flat plate having a principal surface facing the first flow channel,
the second electrode and the fourth electrode each have a shape of a flat plate having a principal surface facing the second flow channel,
the third electrode is wider in width than the first electrode, and
the fourth electrode is narrower in width than the second electrode.

15. The cell culture chip according to claim 1, wherein the cell separation membrane is formed of a porous resin material.

16. The cell culture chip according to claim 1, wherein
the first electrode and the third electrode are disposed on the first principal surface of the cell separation membrane and the second electrode and the fourth electrode are disposed on the second principal surface of the cell separation membrane.

17. The cell culture chip according to claim 1, wherein each of the first, second, third and fourth electrodes comprises a width and a length longer than the width, and the length extends along the direction in which the liquid flows through the overlapping flow channel portion.

18. A cell culture apparatus comprising:
the cell culture chip according to claim 1; and
a measuring instrument for measuring electric resistance between the first electrode and the second electrode.

19. A cell culture method comprising:
culturing predetermined cells with the cell culture chip according to claim 1; and
measuring an electric resistance of the thus-cultured cells with the first electrode and the second electrode.

* * * * *